(12) United States Patent
Wallace

(10) Patent No.: US 11,644,214 B2
(45) Date of Patent: *May 9, 2023

(54) HYDRONIC BUILDING SYSTEMS CONTROL

(71) Applicant: ENERGY ENVIRONMENTAL CORPORATION, Centennial, CO (US)

(72) Inventor: Albert Reid Wallace, Centennial, CO (US)

(73) Assignee: Energy Environmental Corporation, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,710

(22) Filed: Feb. 22, 2022

(65) Prior Publication Data

US 2022/0178566 A1 Jun. 9, 2022

Related U.S. Application Data

(63) Continuation of application No. 17/083,050, filed on Oct. 28, 2020, now Pat. No. 11,287,152, and a
(Continued)

(51) Int. Cl.
*F24F 11/00* (2018.01)
*G05B 15/02* (2006.01)
(Continued)

(52) U.S. Cl.
CPC .......... *F24F 11/80* (2018.01); *F24D 19/1009* (2013.01); *F24F 5/0046* (2013.01);
(Continued)

(58) Field of Classification Search
CPC ........ F24F 11/30; F24F 11/62; F24F 2110/10; F24F 2110/12; F24F 2140/60; F24F 11/63; F24F 11/56; G05B 15/02; G05B 19/042
(Continued)

(56) References Cited

U.S. PATENT DOCUMENTS 3,384,155 A  5/1968 Newton
4,071,078 A  1/1978 Padden
(Continued)

OTHER PUBLICATIONS

"Air Quality in the Home", Illinois Dept. of Public Health, 2012, 5 pages.
(Continued)

*Primary Examiner* — Jigneshkumar C Patel
(74) *Attorney, Agent, or Firm* — Stanley J. Gradisar Attorney At Law, LLC; Stanley J. Gradisar

(57) ABSTRACT

Controlling heating and cooling in a conditioned space utilizes a fluid circulating in a thermally conductive structure in fluid connection with a hydronic-to-air heat exchanger and a ground heat exchanger. Air is moved past the hydronic-to-air heat exchanger, the air having fresh air supply and stale air exhaust. Sensors located throughout the conditioned space send data to a controller. User input to the controller sets the desired set point temperature and humidity. Based upon the set point temperature and humidity and sensor data, the controller sends signals to various devices to manipulate the flow of the fluid and the air in order to achieve the desired set point temperature and humidity in the conditioned space. The temperature of the fluid is kept less than the dew point at the hydronic-to-air heat exchanger and the temperature of the fluid is kept greater than the dew point at the thermally conductive structure.

64 Claims, 7 Drawing Sheets

Related U.S. Application Data continuation of application No. 16/411,695, filed on May 14, 2019, now Pat. No. 10,907,848, and a continuation of application No. 16/059,342, filed on Aug. 9, 2018, now Pat. No. 10,330,336, and a continuation of application No. 15/202,370, filed on Jul. 5, 2016, now Pat. No. 10,072,863, and a continuation of application No. 13/969,316, filed on Aug. 16, 2013, now Pat. No. 9,410,752.

(60) Provisional application No. 61/684,564, filed on Aug. 17, 2012.

(51) Int. Cl.

| | | |
|---|---|---|
| *G05B 19/042* | (2006.01) | |
| *F24F 11/83* | (2018.01) | |
| *F24F 11/84* | (2018.01) | |
| *F24F 11/81* | (2018.01) | |
| *F24F 11/80* | (2018.01) | |
| *F28F 27/00* | (2006.01) | |
| *F24F 5/00* | (2006.01) | |
| *F24F 11/62* | (2018.01) | |
| *F24F 11/77* | (2018.01) | |
| *F24F 11/89* | (2018.01) | |
| *F24D 19/10* | (2006.01) | |
| *G05D 7/06* | (2006.01) | |
| *F24F 11/30* | (2018.01) | |
| *F24F 110/10* | (2018.01) | |
| *F24F 110/12* | (2018.01) | |
| *F24F 110/20* | (2018.01) | |
| *F24F 110/22* | (2018.01) | |
| *F24F 140/60* | (2018.01) | |
| *F24F 140/30* | (2018.01) | |
| *F24F 130/00* | (2018.01) | |
| *F24F 130/10* | (2018.01) | |
| *F24F 11/63* | (2018.01) | |
| *F24F 11/56* | (2018.01) | |

(52) U.S. Cl.
CPC .......... *F24F 11/0008* (2013.01); *F24F 11/30* (2018.01); *F24F 11/62* (2018.01); *F24F 11/77* (2018.01); *F24F 11/81* (2018.01); *F24F 11/83* (2018.01); *F24F 11/84* (2018.01); *F24F 11/89* (2018.01); *F28F 27/00* (2013.01); *G05B 15/02* (2013.01); *G05B 19/042* (2013.01); *G05D 7/0617* (2013.01); *F24F 11/56* (2018.01); *F24F 11/63* (2018.01); *F24F 2110/10* (2018.01); *F24F 2110/12* (2018.01); *F24F 2110/20* (2018.01); *F24F 2110/22* (2018.01); *F24F 2130/00* (2018.01); *F24F 2130/10* (2018.01); *F24F 2140/30* (2018.01); *F24F 2140/60* (2018.01); *Y02A 30/272* (2018.01); *Y02B 10/20* (2013.01)

(58) Field of Classification Search
USPC ...................................................... 700/278
See application file for complete search history.

(56) References Cited

U.S. PATENT DOCUMENTS

| | | | |
|---|---|---|---|
| 4,226,364 A | 10/1980 | Utesch | |
| 4,841,733 A | 6/1989 | Dussault et al. | |
| 5,261,251 A | 11/1993 | Galiyano | |
| 5,669,224 A * | 9/1997 | Lenarduzzi | F25B 41/24 62/238.7 |
| 5,671,608 A | 9/1997 | Wiggs et al. | |
| 5,758,514 A | 6/1998 | Genung et al. | |
| 5,802,862 A | 9/1998 | Eiermann | |
| 5,915,473 A | 6/1999 | Ganesh et al. | |
| 6,062,485 A | 5/2000 | Stege et al. | |
| 6,098,893 A | 8/2000 | Berglund et al. | |
| 6,138,744 A | 10/2000 | Coffee | |
| 6,170,271 B1 | 1/2001 | Sullivan | |
| 6,347,527 B1 | 2/2002 | Bailey et al. | |
| 6,533,186 B2 | 3/2003 | Neve et al. | |
| 6,742,582 B1 | 6/2004 | Wheat et al. | |
| 6,978,631 B2 | 12/2005 | Fuller | |
| 6,991,028 B2 | 1/2006 | Comeaux et al. | |
| 6,996,999 B2 | 2/2006 | Wacker | |
| 7,234,314 B1 | 6/2007 | Wiggs | |
| 7,334,419 B2 | 2/2008 | Gordon et al. | |
| 7,574,871 B2 | 8/2009 | Bloemer et al. | |
| 7,617,697 B2 | 11/2009 | McCaughan | |
| 7,654,104 B2 | 2/2010 | Groll et al. | |
| 7,730,935 B1 | 6/2010 | Bujak, Jr. | |
| 7,740,184 B2 | 6/2010 | Schnell et al. | |
| 7,798,418 B1 | 9/2010 | Rudd | |
| 7,827,814 B2 | 11/2010 | Slater | |
| 7,845,185 B2 | 12/2010 | Knight et al. | |
| 2002/0029583 A1 | 3/2002 | Chung et al. | |
| 2005/0161521 A1 | 7/2005 | Guyer | |
| 2005/0252226 A1 | 11/2005 | Seefeldt | |
| 2006/0101820 A1 | 5/2006 | Koenig et al. | |
| 2006/0144578 A1 | 7/2006 | Fiedrich | |
| 2006/0235666 A1 | 10/2006 | Assa et al. | |
| 2006/0288724 A1 | 12/2006 | Ambs et al. | |
| 2007/0061104 A1 * | 3/2007 | Nagano | G05B 15/02 702/182 |
| 2007/0205298 A1 | 9/2007 | Harrison et al. | |
| 2007/0206436 A1 | 9/2007 | Niermeyer et al. | |
| 2007/0261422 A1 | 11/2007 | Crawford | |
| 2008/0116289 A1 | 5/2008 | Lochtefeld | |
| 2008/0173433 A1 | 7/2008 | Haglid | |
| 2008/0289811 A1 | 11/2008 | Kariya | |
| 2009/0101726 A1 | 4/2009 | Rankich et al. | |
| 2009/0140057 A1 | 6/2009 | Leen | |
| 2009/0281668 A1 | 11/2009 | Nester et al. | |
| 2009/0287355 A1 | 11/2009 | Milder et al. | |
| 2009/0314848 A1 | 12/2009 | Andersson | |
| 2010/0049480 A1 | 2/2010 | Pekar et al. | |
| 2010/0084483 A1 | 4/2010 | Pieper | |
| 2010/0252232 A1 | 10/2010 | Reich et al. | |
| 2010/0300645 A1 | 12/2010 | Glover | |
| 2011/0048502 A1 | 3/2011 | Kikinis et al. | |
| 2011/0114284 A1 | 5/2011 | Siegenthaler | |

OTHER PUBLICATIONS

"Better Buildings, Brighter Future, Innovative Building Technologies and Practices Save Energy and Money", U.S. Dept. of Energy, EERE, 2010, 2 pages.
"Building Technologies Program, Planned Program Activities 2008-2012", U.S. Dept. of Energy, EERE, 2012, 132 pages.
"Buildings Sector Energy Consumption", Buildings Energy Data Book, U.S. Dept. of Energy, 2012, 3 pages.
"HBX ECO-1000 Central Processing Geothermal Control", HBX Control Systems Inc., 2012, 1 page.
"Humidity & Temperature Sensor 086-Flush Mount", tekmar Control Systems, 2012, 3 pages.
"Intermediate Energy Infobook, Statistics Source", Energy Information Administration, 2012, pp. 44-48.
"Program Overview", U.S. Dept. of Energy, EERE, 2009, pp. 1-12.
"Securing America's Future with Energy Efficient Buildings", U.S. Dept. of Energy, 2012, 1 page.
"TekmarNet Thermostat 557-Radiant Floor, 2 Heat Pump/Cool, Backup, Humidity", tekmar Control Systems, 2012, 5 pages.
"tN2 House Control 406—Heat Pump & Backup, Four Zone Valves", tekmar Control Systems, 2012, 5 pages.
"Advanced Sensors and Controls for Building Applications: Market Assessment and Potential R&D Pathways", Brambley et al., Pacific Northwest National Laboratory, 2005, 162 pages.
European Heat Pump Association, Outlook 2011, 8 pages.
European Heat Pump Association, Outlook 2012, 8 pages.

(56) References Cited

OTHER PUBLICATIONS

"Hydronic Radiant Cooling—Overview and Preliminary Performance Assessment", Feustel, Lawrence Berkeley Laboratory, 1993, 43 pages.
"School Indoor Air Quality Best Management Practices Manual", Hall et al., Washington State Dept. of Health, 2003, 135 pages.
"Building Better Homes, Government Strategies for Promoting Innovation in Housing", Hassell et al., RAND Science and Technology Policy Institute, 2003, 124 pages.
"Capacity-Controlled Ground Source Heat Pumps in Hydronic Heating Systems", Karlsson et al., International Journal of Refrigeration, 2007, vol. 30(2), pp. 221-229, Abstract only, 2 pages.
"Impact of Design and Thermal Inertia on the Energy Saving Potential of Capacity Controlled Heat Pump Heating Systems", Karlsson et al., International Journal of Refrigeration, 2008, vol. 31(6), pp. 1094-1103, Abstract only, 2 pages.
"Capacity Control of Residential Heat Pump Heating Systems", Karlsson, Chalmers University of Technology, 2007, 115 pages.
"U.S. Energy Research and Development: Declining Investment, Increasing Need, and the Feasibility of Expansion", Nemet, University of California, 2006, pp. 1-36.
"Radiant Floor Cooling Systems", Olesen, ASHRAE Journal, 2008, pp. 16-22.
"Pacific Gas and Electric Appliance Doctor Pilot Project", Proctor, Proctor Engineering Group, Ltd., 1990, 115 pages.
"Energy Consumption Characteristics of Commercial Building HVAC Systems, vol. III: Energy Savings Potential", Roth et al., Tiax LLC, 2002, 281 pages.
"Energy Impact of Commercial Building Controls and Performance Diagnostics: Market Characterization, Energy Impact of Building Faults and Energy Savings Potential", Roth et al., Tiax LLC, 2005, Part 1, 200 pages.
"Energy Impact of Commercial Buildings Controls and Performance Diagnostics: Market Characterization, Energy Impact of Building Faults and Energy Savings Potential", Roth et al., Tiax LLC, 2005, Part 2, 213 pages.
"Field Evaluation of a Residential Hydronic Distribution System in the Cooling Mode", Vineyard et al., Ashrae Transactions, 2000, vol. 106, Part 2, MN-00-12-4, pp. 1-8.
"Country Update for Sweden", Bjelm et al., Lund University, 2010, pp. 1-9.
Kiel Moe, "Thermally Active Surfaces In Architecture," 2010, pp. 84-91.
Nicholas Thomas Gayeski ; "Predictive Pre-Cooling Control for Low Lift Radiant Cooling using Building Thermal Mass"; Sep. 2010.
*Energy Environmental Corporation* v. *City and County of Denver*, Plaintiff's Replacement Disclosure of Asserted Claims and Infringement Contentions, Mar. 18, 2022.
*Energy Environmental Corporation* v. *City and County of Denver*, Denver Water'S Invalidity Contentions, Oct. 11, 2022.
MKK Consulting Engineers, Inc., Building Permit Set, DenverWater223183, Feb. 12, 2010.
MKK Consulting Engineers, Inc., Shop Drawing Submittal Review Comments, DenverWater223216 Part One, Dec. 16, 2011.
MKK Consulting Engineers, Inc., Shop Drawing Submittal Review Comments, DenverWater223216 Part Two, Dec. 16, 2011.
MKK Consulting Engineers, Inc., Construction Documents Denver County Jail New Housing Unit, DenverWater2233220 Part One, Jan. 20, 2012.
MKK Consulting Engineers, Inc., Construction Documents Denver County Jail New Housing Unit, DenverWater2233220 Part Two, Jan. 20, 2012.
Controls Sequence, DenverWater223599b, Aug. 18, 2010.
Musson Cattell Mackey Partnership, DenverWater223648 Part One, Jul. 10, 2006.
Musson Cattell Mackey Partnership, DenverWater223648 Part Two, Jul. 10, 2006.
Musson Cattell Mackey Partnership, DenverWater223648 Part Three, Jul. 10, 2006.
Musson Cattell Mackey Partnership, DenverWater223648 Part Four, Jul. 10, 2006.
SMUD EC-OC, Sequence of Operations—Central Plant, DenverWater223732, Oct. 17, 2011.
SMUD EC-OC, Sequence of Operations—DS Office Building, DenverWater223759, Oct. 7, 2011.
Turner Construction Company, DenverWater223773 Part One, Jan. 18, 2011.
Turner Construction Company, DenverWater223773 Part Two, Jan. 18, 2011.
*Energy Environmental Corporation* v. *City and County of Denver* U.S. Pat. No. 9,410,752 Claims 1, 2, 5, 7, Exhibit A, Mar. 18, 2022.
*Energy Environmental Corporation* v. *City and County of Denver* U.S. Pat. No. 10,072,863 Claims 1, 9, 11, 12, 36, Exhibit B, Mar. 18, 2022.
*Energy Environmental Corporation* v. *City and County of Denver* U.S. Pat. No. 10,330,336 Claims 52, 63-67, 73-75, Exhibit C, Mar. 18, 2022.
*Energy Environmental Corporation* v. *City and County of Denver* U.S. Pat. No. 10,907,848 Claims 1, 5, 7-11, 13-16, 19, 20, 25, 26, 28-31, 33-36, 38-41, Exhibit D, Mar. 18, 2022.
2011 ASHRAE Handbook HVAC Applications SI Edition (EEC017099).
2011 ASHRAE Handbook HVAC Applications (SI) p. 34.6.
User's Manual for ANSI/ASHRAE/IES Standard 90.1-2010, pp. 6-95, 6-99.
Engineering Manual of Automatic Control, pp. 132-147.
Fuestel, Helmut E., Hydronic Radiant Cooling, Energy and Buildings 22 (1995), pp. 193-205.
Geothermal Programming Guide, HBX Control Systems, Inc., 2012.
Henze, Gregor P. et al., Evaluation of optimal control for active and passive building thermal storage, pp. 173-183, 2004.
Leigh, S. B. et al, A Study for Evaluating Performance of Radiant Floor Cooling Integrated with Controlled Ventilation, pp. 71-82, ASHRAE Transactions, 2005.
Moore, Timothy, Simulation of Radiant Cooling Performance With Evaporative Cooling Sources, pp. i-71, May 2008.
Mumma, Stanley A., Chilled Ceilings in Parallel with Dedicated Outdoor Air Systems: Addressing the Concerns of Condensation, Capacity, and Cost, American Society of Heating, Refrigerating and Air-Conditioning Engineers, Inc., pp. 220-231, 2002.
Mumma, Stanley A., Dedicated Outdoor Air in Parallel with Chilled Ceiling System, Engineered Systems, pp. 56-66, Nov. 2001.
Mumma, Stanley A. et al., Direct Digital Temperature, Humidity, and Condensate Control for a Dedicated Outdoor Air-Ceiling Radiant Cooling Panel System, American Society of Heating, Refrigerating and Air-Conditioning Engineers, Inc., pp. 547-558, 2005.
Jeong, Jae-Weon et al., Energy Conservation Benefits of a Dedicated Outdoor Air System with Parallel Sensible Cooling by Ceiling Radiant Panels, pp. 627-636, ASHRAE Transactions, 2003.
Murphy, John, Using VAV to Limit Humidity at Part Load, ASHRAE Journal, pp. 18-22, Oct. 2010.
Olesen, Bjarne W. et al., Control of Slab Heating and Cooling Systems Studied by Dynamic Computer Simulations, pp. 1-10, ASHRAE Transactions 2002.
Olesen, Bjarne W., Radiant Floor Heating in Theory and Practice, pp. 19-26, ASHRAE Journal Jul. 2002.
Sprecher, Franz, An introduction to radiant cooling technology, pp. 1-35, REDEC May 1999.
Radiant Heating & Cooling—VAV Ventilation for High Latent Loads, pp. 1-3, REDEC Oct. 1999.
Siegenthaler, John, Outdoor Reset Control—No Quality Hydronic System Should be Without It, pp. 1-8, Feb. 2001.
Simmonds, Peter et al., Radiant Cooled Floors—Operation and Control Dependant upon Solar Radiation, pp. 358-367, ASHRAE Transactions 2006.
Simmonds, Peter, The Design, Simulation, and Operation of a Comfortable Indoor Climate for a Standard Office, pp. 1-14, 1992.
Simmonds, Peter et al., The Integration of Radiant Components to Maintain Occupant Comfort in a Multifunctional Space, pp. 1-8, ASHRAE 2009.

(56) References Cited

OTHER PUBLICATIONS

Simmonds, Peter et al., Applied Performance of Radiant Ceiling Panels for Cooling, pp. 1-9, ASHRAE 2006.
Stauch, Vanessa et al., Weather forecasts, observations and algorithms for building simulation and predictive control, pp. 1-15, Jul. 30, 2010.
Tekmar Brochure, Leading the Way in Heat Pump Control, p. 1, 2012.
Tekmar Installation & Operation Manual tekmarNet® 2 House Control 406, pp. 1-48, 2011.
Tekmar Humidity & Temperature Sensor 086 Installation & Operation Manual, pp. 1-8, 2012.
Tekmar Submittal Humidity & Temperature Sensor 086, pp. 1-2, 2012.
Tekmar Brochure tN2 House Control 406 Heat Pump & Backup, Four Zone Valves, pp. 1-2, 2012.
Complete Design Assistance Manual (CDAM), Uponor, Chapter 10, pp. 127-132, 2010.
Uponor Radiant Heating Systems Thermostat User Manual, pp. 1-27, 2008.
Water Piping and Pumps, Carrier, pp. 1-2, 2000.
Plaintiff Energy Environmental Corporation's Response to Defendant Denver Water's Invalidity Contentions, pp. 1-73, Jun. 24, 2022.
Appendix A Invalidity Claim Chart for '752 Patent, pp. 1-29, Jun. 24, 2022.
Appendix B Invalidity Claim Chart for '863 Patent, pp. 1-34, Jun. 24, 2022.
Appendix C Invalidity Claim Chart for '336 Patent, p. 1, Jun. 24, 2022.
Appendix D Invalidity Claim Chart for '848 Patent, pp. 1-64, Jun. 24, 2022.
*Energy Environmental Corporation* v. *City and County of Denver* U.S. Pat. No. 9,410,752 Claim Chart, pp. 1-64, Jun. 24, 2022.
*Energy Environmental Corporation* v. *City and County of Denver* U.S. Pat. No. 10,072,863 Claim Chart, pp. 1-20, Jun. 24, 2022.
*Energy Environmental Corporation* v. *City and County of Denver* U.S. Pat. No. 10,330,336, Jun. 24, 2022.
*Energy Environmental Corporation* v. *City and County of Denver* U.S. Pat. No. 10,907,848 Claim Chart, pp. 1-102, Jun. 24, 2022.
Exhibit D *Energy Environmental Corporation* v. *City and County of Denver* U.S. Pat. No. 10,907,848, pp. 1-154, Mar. 18, 2022.
Exhibit C *Energy Environmental Corporation* v. *City and County of Denver* U.S. Pat. No. 10,330,336, pp. 1-27, Mar. 18, 2022.
Exhibit B *Energy Environmental Corporation* v. *City and County of Denver* U.S. Pat. No. 10,072,863, pp. 1-19, Mar. 18, 2022.
Exhibit A *Energy Environmental Corporation* v. *City and County of Denver* U.S. Pat. No. 9,410,752, pp. 1-12, Mar. 18, 2022.
Plaintiff'S Replacement Disclosure of Asserted Claims and Infringement Contentions, pp. 1-5, Mar. 18, 2022.
U.S. Appl. No. 13/969,316, filed Aug. 16, 2013 now U.S. Pat. No. 9,410,752.
U.S. Appl. No. 15/202,370, filed Jul. 5, 2016 now U.S. Pat. No. 10,072,863
U.S. Appl. No. 16/059,342, filed Aug. 9, 2018 U.S. Pat. No. 10,330,336.
U.S. Appl. No. 16/411,695, filed May 14, 2019 U.S. Pat. No. 10,907,848.
U.S. Appl. No. 17/083,050, filed Oct. 28, 2020 U.S. Pat. No. 11,287,152.

* cited by examiner

HBSC Energy Savings Potential Compared to Baseline HVAC System

Technology Gaps Addressed with HBSC

Client-Server Architecture

Comparison of temperature levels for a radiator system with no lag time and 10 minutes lag time. Fixed speed GHP operating at 100% with DOAT at 48 degrees F.

GHP Parallel Piping Design versus Serial Boiler Connection to Hydronic System

Boundaries for Optimizing the Demand and Source Systems

HYDRONIC BUILDING SYSTEMS CONTROL

CROSS-REFERENCES TO RELATED APPLICATIONS

This application is a Continuation of U.S. patent application Ser. No. 17/083,050 filed Oct. 28, 2020, which is a Continuation of U.S. patent application Ser. No. 16/411,695 filed May 14, 2019, now U.S. Pat. No. 10,907,848 issued on Feb. 2, 2021, which is a Continuation of U.S. patent application Ser. No. 16/059,342 filed Aug. 9, 2018, now U.S. Pat. No. 10,330,336 issued Jun. 25, 2019, which is a Continuation of U.S. patent application Ser. No. 15/202,370 filed Jul. 5, 2016, now U.S. Pat. No. 10,072,863 issued Sep. 11, 2018, which is a Continuation of U.S. patent application Ser. No. 13/969,316 filed Aug. 16, 2013, now U.S. Pat. No. 9,410,752 issued Aug. 9, 2016, which claims the benefit of U.S. Provisional Application No. 61/684,564 filed Aug. 17, 2012, the full disclosures of which are incorporated herein by reference in their entirety for all purposes.

BACKGROUND

This disclosure is related to hydronic heating and cooling applications and more specifically to software control systems for hydronic heating and cooling applications.

Identification and Significance of the Problem or Opportunity—More energy is consumed by buildings than any other segment of the U.S. economy, including transportation or industry, with almost 41% of total U.S. energy consumption devoted to taking care of our nation's home and commercial building energy needs. This is an increase from 39% in 2006, which utilized approximately 39 quadrillion Btu (quads) of energy to service the 113 million households and 74.8 billion square feet of commercial floor space in the United States. Total building primary energy consumption in 2009 was about 48% higher than consumption in 1980. Space heating, space cooling, and lighting were the dominant end uses in 2010, accounting for close to half of all energy consumed in the buildings sector.

More than $400 billion is spent each year to power homes and commercial buildings, consuming more than 70% of all electricity used in the U.S. and contributing to almost 40% of the nation's carbon dioxide emissions. The Energy Information Administration estimates that energy consumption in buildings—primarily electricity and natural gas—will exceed fifty quads in the next two decades. If the U.S. can reduce building energy use by 20%, approximately $80B would be saved annually on energy bills, and significant reduction of greenhouse gas emissions would be realized.

Next-generation building controls have the potential to produce significant energy savings in buildings. For example, annual energy consumption associated with functions addressed by conventional building controls—i.e., lighting, heating, cooling, and ventilation—totals nearly ten quads, or 57% of primary energy. These ten quads broadly frame the energy savings opportunity for building controls. Investment in energy-efficiency R&D within the buildings sector—especially in the key area of advanced controls—could significantly reduce energy consumption. However, the potential to realize these savings via innovative building controls has been hampered by several market and industry barriers.

First, R&D investment in the building industry is much lower than in many other industries. This is in part due to market fragmentation, with many actors required to construct and operate a building (e.g., manufacturers, designers, builders, subcontractors, suppliers, etc.). This limits the ability of the private sector to effectively coordinate research and reliably bring innovations to market. Moreover, building control innovations are particularly challenging to bring to this cost-sensitive market because their benefits are difficult to quantify—especially without independent verification of savings levels. Investment in building energy efficiency R&D by private companies dropped 50% between 1991 and 2003.

Development of innovative and cost-effective controls is also hampered by ownership issues of commercial and residential buildings. Building occupants who are not owners have little incentive to invest in building-efficiency improvements. The owners are also unwilling to upgrade to high-efficiency equipment and appliances because they do not see the benefit of reduced utility bills, which the occupant pays. For example, while utilities constitute only 1% of total building expenses, they account for 30% of tenant operating expenses. Peak demand charges account for 40% of commercial building electricity expenses, of which 75% of these relate to lighting and Heating, Ventilation, and Air Conditioning (HVAC) systems. Most commercial buildings are cooling dominated. Ground Source Heat Pumps (GHPs) can reduce peak demand charges by operating at one-half the peak load electrical demands of conventional equipment. When combined with hydronic high thermal mass distribution systems, GHP-centric HVAC systems have the potential to reduce tenant operating expenses over 20%. Hydronic as used herein is defined as the use of a fluid such as water as the heat-transfer medium in heating and cooling systems.

Prevailing design/bid/build paradigms also impede deployment of advanced controls, with focus on completing buildings quickly and inexpensively. Common sequential design processes make extensive use of prior design experience, resulting in a bias against innovative approaches with lower market adoption. Integrated and synergistic design of building systems is also challenged by current practices.

Finally, a central issue with installing controls to implement energy savings measures is that energy expenditures account for a small (approximately 1%) proportion of total annual building expenditures. Investment in core business activities often competes with energy-efficiency investments such as advanced controls. Building owners/operators must have very high levels of confidence that investments in building controls will have a quick payback for those investments to prove attractive. The innovation disclosed herein delivers the technology that will provide that high level of confidence.

Advanced, low-cost, "smart" building controls have the technical potential to reduce U.S. commercial building HVAC and lighting energy consumption by about one quad of primary energy annually, or roughly 6% of current total use. In addition, many offer significant peak-demand reduction potential. But as stated above, advanced building controls face first-cost and several non-economic barriers to realizing greater market penetration. The U.S. Department of Energy Building Technologies Program understands these unique technology and industry barriers to developing innovative technologies, and has requested high-risk, high-reward innovative research focused on technology that has the potential to contribute to a 50% reduction in energy demand by residential and commercial buildings at less than the cost of the energy saved (800 trillion Btu's in annual savings by 2020 and 3,000 trillion Btu's in annual savings by 2030).

As part of that "50% reduction" effort, the Department of Energy (DOE) is striving to develop and demonstrate "crosscutting, whole building technologies such as sensors and controls. These efforts support the net zero energy building's goal not only by reducing building energy needs, but also by developing design methods and operating strategies which seamlessly incorporate solar and other renewable technologies into commercial buildings."

Integrated hydronic heating and cooling applications have the potential to reduce the residential and commercial building energy use by 50% while increasing occupant comfort, safety, and indoor environmental quality at substantially less cost than the energy saved.

The Hydronic Building Systems Control (HBSC) described in this disclosure is a low-cost standards-compliant software-based control that integrates traditional and renewable hydronic system components for building heating, cooling, and hot water. HBSC addresses known technology gaps with a software solution, and produces a controls requirement specification that can be hosted on commodity hardware such as that developed for the smart phone market.

HBSC also addresses shortcomings of commonly used HVAC systems by removing barriers to market adoption of hydronic heating and cooling systems. Widespread use of forced air systems contributes to high healthcare costs and decreased occupant productivity caused by poor Indoor Environmental Quality (IEQ) and thermal comfort, while increasing vulnerability to terrorist attack with potential negative impact on public welfare and national security. Current hydronic system technologies, while highly energy efficient, struggle in the marketplace due to system cost, controller complexity, and retrofit difficulty. HBSC technology has the ability to overcome problems with forced air systems providing heating, cooling, and ventilation.

The American Society of Heating Refrigeration and Air Conditioning Engineers (ASHRAE) and international standards organizations mandate the use of mechanical ventilation to provide fresh air in tight buildings. For higher system energy efficiency, heat recovery is combined with the mechanical ventilation using an energy transfer and ventilation device. The heat exchange and ventilation is usually achieved with an air-to-air heat exchanger with one or more built-in fans, commonly known as a Heat Recovery Ventilator (HRV) or Energy Recovery Ventilator (ERV). In climates where heating is more prevalent than air conditioning, an HRV is used. In cooling climates, an ERV is recommended. In hot humid climates, air conditioning and/or dehumidification equipment are used in conjunction with ERVs or HRVs to enhance user comfort and indoor climate.

Within a HRV, contaminated exhaust air and fresh outside air pass through the heat recovery core in separate passages that prevent air contamination or mixture. The fresh outside air then absorbs the heat and warms up, and is distributed at a more comfortable temperature to the various rooms by the ventilation system. An HRV can help make mechanical ventilation more cost effective by reclaiming energy from exhaust airflows. HRVs use heat exchangers to heat or cool incoming fresh air, recapturing 60% to 80% of the conditioned temperatures that would otherwise be lost. Conventional fan and vent assemblies for bathrooms and kitchens, often required by building code standards for ventilation, may allow significant energy losses. An HRV system can incorporate small, separately switched booster fans in these rooms to control moisture or heat generated by activities like showering or cooking. Odors and pollutants can quickly be removed, but energy used to condition the air is recycled in the heat exchanger.

ERVs exchange moisture between the exhaust and fresh air streams. ERVs are especially recommended in climates where cooling loads place strong demands on HVAC systems. In some cases, ERVs may be suitable in climates with very cold winters. If indoor relative humidity tends to be too low, what available moisture there is in the indoor exhaust air stream is transferred to incoming outdoor air. However, ERVs are not dehumidifiers. While the ERV transfers moisture from the humid air stream (incoming outdoor air in the summer) to the exhaust air stream, the desiccant wheels used in many ERVs become saturated fairly quickly and the moisture transfer mechanism becomes less effective with successive hot, humid periods. Mechanical vapor compression refrigeration equipment, known as air conditioners, is the most common approach utilized to reduce humidity while cooling.

Refrigeration air conditioning equipment usually reduces the humidity of the air processed by the system. The process is highly effective in cooling to reduce sensible and latent heat contained in the air. Sensible heat is the energy exchanged by a thermodynamic system that has as its sole effect a change of temperature. Latent heat is the quantity of heat absorbed or released by a substance undergoing a change of state, such as ice changing to water or water to steam, at constant temperature and atmospheric pressure. A forced-air cooling system has the ability to remove sensible heat (cooling the air) and remove latent heat (through dehumidification which removes heat contained in the water vapor in the air stream). The dew point is the temperature below which the water vapor in a volume of humid air at a given constant barometric pressure will condense into liquid water at the same rate at which it evaporates. The relatively cold (below the dew point) evaporator coil condenses water vapor from the processed air (much like an ice-cold drink will condense water on the outside of a glass), sending the water to a drain and removing water vapor from the cooled space and lowering the relative humidity. Since humans perspire to provide natural cooling by the evaporation of perspiration from the skin, drier air (up to a point) improves the comfort provided. Humans are most comfortable when 40% to 50% relative humidity is maintained in the occupied space.

A specific type of air conditioner that is used only for dehumidifying is called a dehumidifier. A dehumidifier is different from a regular air conditioner in that both the evaporator and condenser coils are placed in the same air path, and the entire unit is placed in the environment that is intended to be conditioned (in this case dehumidified), rather than requiring an external condenser coil. Having the condenser coil in the same air path as the evaporator coil produces warm, dehumidified air. The evaporator (cold) coil is placed first in the air path, dehumidifying the air exactly as a regular air conditioner does. The air next passes over the condenser coil re-warming the now dehumidified air. Note that the terms "condenser coil" and "evaporator coil" do not refer to the behavior of water in the air as it passes over each coil; instead, they refer to the phases of the refrigeration cycle. Having the condenser coil in the main air path rather than in a separate, outdoor air path (as in a regular air conditioner) results in two consequences—the output air is warm rather than cold, and the unit is able to be placed anywhere in the environment to be conditioned, without a need for an external condenser.

Unlike a regular air conditioner, a dehumidifier will actually heat a room just as an electric heater that draws the same amount of power as the dehumidifier. A traditional air conditioner transfers energy out of the room by means of the condenser coil, which is outside the room. In this thermodynamic system, the room is the system and energy is transferred out of the system. Conversely with a dehumidifier, no energy is transferred out of the thermodynamic system because the dehumidifier is entirely inside the room. The power consumed by the dehumidifier is energy that is input into the thermodynamic system and remains in the room as heat energy.

Air-conditioning systems using cooling towers can promote the growth and spread of microorganisms, such as *Legionella pneumophila*, the infectious agent responsible for Legionnaires' disease, or thermophilic actinomycetes. Conversely, air conditioning, including filtration, humidification, cooling, disinfection, etc., can be used to provide a clean, safe, hypoallergenic atmosphere in environments where an appropriate atmosphere is critical to occupant safety and well-being. Air conditioning can have a negative effect by drying out the air causing dry skin and negatively affecting sufferers of allergies and asthma. Air conditioning can also be used for dehumidification, as water vapor condenses on the air coil during cooling.

Specific issues associated with forced air HVAC systems include:
1. Poor Energy Performance Due To Distribution Ductwork—Poorly installed forced air residential HVAC systems often use twice the energy of a properly installed system. Duct leakage in commercial buildings accounts for 0.3 quads of annual energy consumption. In a study involving residences in Fresno, Calif., 93% of the homes had duct leakage greater than 150 cubic feet per minute. A recent audit of certified air conditioning contractors by Xcel Energy for a high efficiency rebate program in Colorado found that in 46% of the retrofit installations conducted in 2011, neither the ductwork nor the equipment was installed correctly.
2. Poor IEQ and Thermal Comfort—Prior research shows a correlation between employee productivity, IEQ, and thermal comfort. The costs attributable to these indoor climate conditions have a greater economic impact than all building operations and energy expenses combined. The dominance of worker salaries as a percentage of office building expenses is staggering, accounting for approximately 80% of expenditures in a small office building. Increasing employee productivity 2% would offset all building operations and energy expenses combined. The healthcare and legal costs associated with poor IEQ are equally formidable. For example, Legionnaire's disease can occur from the airborne dispersal of *Legionella* bacteria from improperly maintained cooling towers, humidifiers, and evaporative condensers. Most building owners do not acknowledge that forced air HVAC systems are causal agents to poor IEQ resulting in higher absenteeism or poor health.
3. Vulnerability to Terrorist Attack—Commercial building owners are ignorant of the terrorist risk inherent with large forced air systems. Ground-mounted HVAC equipment and the related forced air distribution systems which return air from any one zone to the entire building ventilation system are particularly vulnerable. Due to the air volume required to heat, cool, and ventilate, a typical 100 ton rated Variable Air Volume (VAV) system weighs over twenty tons and requires 5,000 cubic feet of space. A 100,000 square foot building requires four of these units. In many cases the size and weight requirements force a designer to place the units at ground level. By introducing a chemical, biological, radioactive, or nuclear agent into these systems, a terrorist could inflict mass human casualties and great psychological damage.

Although hydronic systems offer solutions to these shortcomings, they bring with them a unique set of adoption barriers, including:
1. Market Bias—While HVAC system designers have a bias toward vapor compression technology, the highest system energy efficiency is possible with the direct use of heated or cooled fluids in a hydronic distribution system (radiant floor, radiant ceiling panels, chilled beams, or hydronic fan coils). Passive cooling using chilled fluid from a Ground Source Heat Exchanger (GHEX), and passive heating using process heat or solar fluid provides the highest system energy efficiency. The system design is straightforward, and the heat transfer can be accomplished with a low energy circulator, without the need for a boiler, chiller, or GHP. However, a barrier to adoption is the lack of a commercial control appropriate for this application.
2. Perceived High First Cost—High mass radiant floor systems are perceived to have a higher first cost than ducted air systems. HVAC systems designers in the U.S. prefer forced air systems over hydronic systems, though most will acknowledge that radiant floor heating systems are more comfortable with improved IEQ to the forced-air alternative. Designers incorrectly assume these technologies are incompatible. Hydronic distribution used in conjunction with hydronic fan coils is a viable compromise, particularly with Water-to-Water (W-W) GHPs providing both hot and chilled water. An in-floor high mass radiant heating and cooling system—installed at a lower cost than a ducted air system—would be market disrupting.
3. Poor Hydronic Control Outcomes—Customers lack confidence in advanced control capabilities and the energy savings benefits of integrated renewable energy equipment, such as GHPs, for the following reasons:
a. Most conventional off-the-shelf controls are functional for one device using a few sensors. With few exceptions, such as set-back capabilities, they do not provide optimal system energy efficiency. Residential examples include separate controls for the furnace, hot water and HRV/ERV, with more pronounced energy losses and thermal discomfort issues in large commercial buildings which have even less zoning functionality.
b. Enterprise Direct Digital Controls (DDCs) are expensive to install, program and maintain. Soft costs for design, implementation, commissioning, and maintenance are substantial, often eliminating any value for controls investment. Enterprise controls may provide interoperability, yet usually do not provide higher system energy efficiency. Besides the first cost of these controls, this lack of proven performance represents the largest market barrier. DDC is complicated, proprietary and owners often feel "held hostage" by controls companies. The high soft costs associated with these controls reduce building commissioning rates to less than 5% for new construction and 0.03% of existing buildings.
c. Lowest Common Denominator Control Solutions—The HVAC industry is segmented by product. Manufacturers, suppliers, and installers are aligned to these product lines. The end result is serial control of disparate equipment with minimal consideration or expertise applied to system energy efficiency. Design professionals, builders, and HVAC contractors will require a baseline system architecture which is affordable, easy to implement, and provides seamless interoperability between legacy equipment and emerging technology.

d. Inadequate controls and equipment efficiency ratings based on steady state test conditions have created distrust by building owners toward control and equipment manufacturers who have failed to deliver on efficiency claims. Equipment efficiency ratings for heating (Coefficient Of Performance, COP) and cooling (Seasonal/Energy Efficiency Ratings, SEER/EER) published by the Air Conditioning and Heating Institute (ARI) are not substantial for predicting actual system performance. The ARI metrics are based on steady state moderate test conditions without consideration for overall system energy efficiency (Seasonal Performance Factor, SPF) affected by seasonal temperature extremes, partial load conditions, intermittent operation and HVAC distribution efficiency.

e. Hydronic distribution systems are more efficient than forced air systems. Yet commercial controls in the U.S. for hydronic applications are limited. These systems may incorporate space heating and cooling via a radiant floor, radiant ceiling, or distributed hydronic fan coils. In all of these distribution methods, the highest system energy efficiency gains are possible by controlling the operation of the heating/cooling equipment along with the supply temperature.

f. W-W ground source heat pumps are more efficient with greater functionality than boilers, yet the available GHP hydronic controls use boiler control logic. Within the U.S., the majority of W-W ground source heat pumps utilize a single stage compressor and do not require multi-stage controls. However, when a W-W GHP is equipped with a two-stage compressor, the typical control is single stage.

g. Water-to-Air (W-A) GHPs are more efficient with greater functionality than furnaces with direct exchange cooling or air source heat pumps, yet the available controls are often modified furnace/air conditioner thermostats with three levels of heating, two cooling, and a fan mode. Source circulator control as provided by the GHP manufacturer is typically a binary relay. Since the source circulators are usually contained in one "flow center," this on-off functionality activates all of the source side circulator pumps providing sufficient flow for the rated maximum capacity of the GHP. In a residential application utilizing a GHP equipped with a two-stage compressor, the GHP operates at second stage less that 20% of the heating/cooling season. One pump in a typical two pump flow center uses 500 watts of power. If the heat pump is rated at 6 tons, two pumps are used. Yet at partial load conditions, only one pump is required. By reducing the source flow when the GHP is at partial load conditions, the system energy efficiency is increased without changing the GHP's component efficiency. The excessive energy use of these circulators under partial load conditions is not accounted for in GHP ARI ratings. In typical applications, the circulators are fixed speed. Unless the GHP or controls manufacturer provides energy efficient circulator control, the overall highest system energy efficiency—which includes the energy consumption of source side circulator pumps—is not optimum. If the manufacturer does not provide relays for multiple pumps, multiple speed pumps, or variable speed pumps control, installing contractors install the flow center with all pumps active regardless of actual flow requirements under partial load conditions. These limitations cause the GHPs to underperform with respect to advertised efficiencies derived in steady state testing. Recently, dedicated variable speed controllers are offered on board heat pumps equipped with variable speed compressors. Source side pump control is not typically available for enterprise control of multiple heat pumps. Attaining the highest system energy efficiency determines the operation of the circulator pumps. An industry acceptable flow rate for a ground or water source heat pump is 3 gallons per minute per ton of actual output. A heat pump incorporating a multi-stage or variable speed compressor does not require flow at the rated capacity, rather a flow rate which meets the actual capacity. The required flow may also be varied based on the entering water temperature to the heat pump. However, existing logic boards with the GHPs assume that source water temperature cannot be varied, so available controls do not account for water temperature variances when optimizing system energy efficiency.

4. Lost Cost Reduction Opportunities Are Missed Without Synergistic Design a. High mass radiant floor heating infrastructure can use the same distribution medium for cooling. Due to a lack of capable and cost-effective controls for chilled beams and Radiant Floor Cooling (RFC), building owners typically install two complete distribution systems—high mass radiant hydronic heating and ducted air system for cooling and ventilation. Radiant cooling systems use 42% less energy than comparable VAV systems (see Table 1 below).

TABLE 1

Peak HVAC Energy Consumption Comparison, VAV versus Radiant Cooling

| Item | % Power in VAV | % Power in Radiant Cooling |
|---|---|---|
| Fan And Motor | 37.5% | 1.5% |
| Load From Lights | 18.8% | 9.4% |
| Air Transport Load | 9.3% | 1.9% |
| Other Loads | 34.4% | 34.4% |
| Pumps | — | 1.5% |
| Total | 100% | 57.7% |

The savings illustrated above result from the efficiencies created by hydronic distribution, increased effectiveness of radiant cooling to remove infrared heat gains from direct solar and lighting sources, and reduced air transport loads. These savings are based on using traditional chillers operating at less than one-half the efficiency of W-W GHPs. GHPs are ideal to replace boilers in Radiant Floor Heating (RFH) applications due to the lower supply temperatures required with radiant hydronic distribution. Building owners often replace inefficient boilers with condensing boilers as the first costs of GHPs do not justify an investment for heating only operations. Yet GHP equipment combined with radiant cooling architectures would decrease energy use far more than the 42.3% savings predicted above.

b. Hydronic heating and cooling systems create an opportunity to incorporate Dedicated Outdoor Air System (DOAS) or Demand Controlled Ventilation (DCV) to improve system energy efficiency, IEQ, and occupant comfort. When forced air systems are designed for ventilation and latent heat extraction only, and not the building heating and cooling sensible loads, the required air velocity and volume are greatly reduced.

DOAS is a type of HVAC system that consists of two parallel systems: a dedicated outdoor air ventilation system that handles latent loads and a parallel system to handle sensible loads. DCV systems modulate outdoor intake based on carbon dioxide levels. These systems have a simple payback period of 2-5 years and the national energy savings potential of 0.3 quads.

c. Solar thermal array capacity is constrained by storage capacity. Solar thermal tanks require a higher first cost investment than solar thermal collectors. Reducing the requirement to install storage tanks to match the solar array could reduce the first cost of solar thermal arrays by 50%, while eliminating the maintenance and replacement costs for over sizing storage to meet array demands. A ground source heat exchanger is ideal to handle this excess capacity, yet GHP contractors are not familiar with design criteria for this hybrid system and lack the controls to implement a design.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The Hydronic Building Systems Control is a temperature and humidity control apparatus for air and temperature variable fluid in an air space, comprising a thermally-conductive structure, such as a building floor, wall, or ceiling; hydronic coil-to-air heat exchanger; a source of liquid coolant at a temperature below or above the temperature of the air space; controllable means for applying a temperature variable liquid at a temperature higher than the dew point of the air space to the thermally-conductive structure and for applying a temperature variable liquid coolant at a temperature lower than the dew point to the hydronic coil-to-air heat exchanger; means for sensing at least the air temperature in the air space, a relative humidity of the air space, a temperature of the thermally-conductive structure, and liquid source temperatures; a controller coupled to the sensing means and to the controllable means.

Proposed Innovation Objectives—The Detailed Description below describes HBSC which addresses barriers facing well-integrated hydronic system solutions and increases the adoption of technologies that can surpass the energy performance of conventional forced air distribution systems, while providing superior health, safety, and comfort benefits. Objectives of HBSC include, but are not limited to:

1. Delivery at Speed and Scale—Commercialize a product in less than two years at a price which drives rapid market adoption.
2. Interoperability—Design interoperable solutions that improve the ease and likelihood of system energy efficiency retrofits.
3. Accelerate the implementation of affordable hydronic distribution systems.
4. Increase the market acceptance for ground source heat pumps.
5. Lower the cost and improve the solar fraction of solar thermal systems.
6. Create a control requiring minimal or no user input for optimum operation with high reliability and proven energy savings, which minimizes the soft costs attributable to installation, commissioning, and maintenance.
7. Drive the early adoption of high impact emerging technologies, which will improve the efficiency of integrated hydronic systems, including high thermal conductivity nanofluids, multifunction sensors, and self-optimizing algorithms.

Public Benefits—HBSC provides the following public benefits:

1. HBSC will ease the financial burden and accelerate the adoption of system energy efficiency improvements reducing environmental impact and global energy use for building heating, cooling, and hot water.
2. Reduce the soft costs attributable to installation, commissioning, and maintenance through self-optimization and intuitive graphical user interface.
3. Lower operating costs with a reliable control which builds owner confidence creating wider acceptance of hydronic distribution and enterprise systems.
4. Improve IEQ and thermal comfort which increases occupant productivity and health, and reduces absenteeism and associated health care costs.
5. Eliminate the potential vulnerabilities associated with exposed air handling equipment in commercial buildings with hydronic distribution systems which decouple heating and cooling from ventilation air flows.
6. Increase market adoption of GHP and solar thermal technologies.
7. Accelerate the adoption of emerging technologies which will improve energy efficiency, such as enhanced thermal conductivity nanofluids, multifunction sensors, and self-optimizing algorithms for optimal system energy efficiency.

Figure 1:
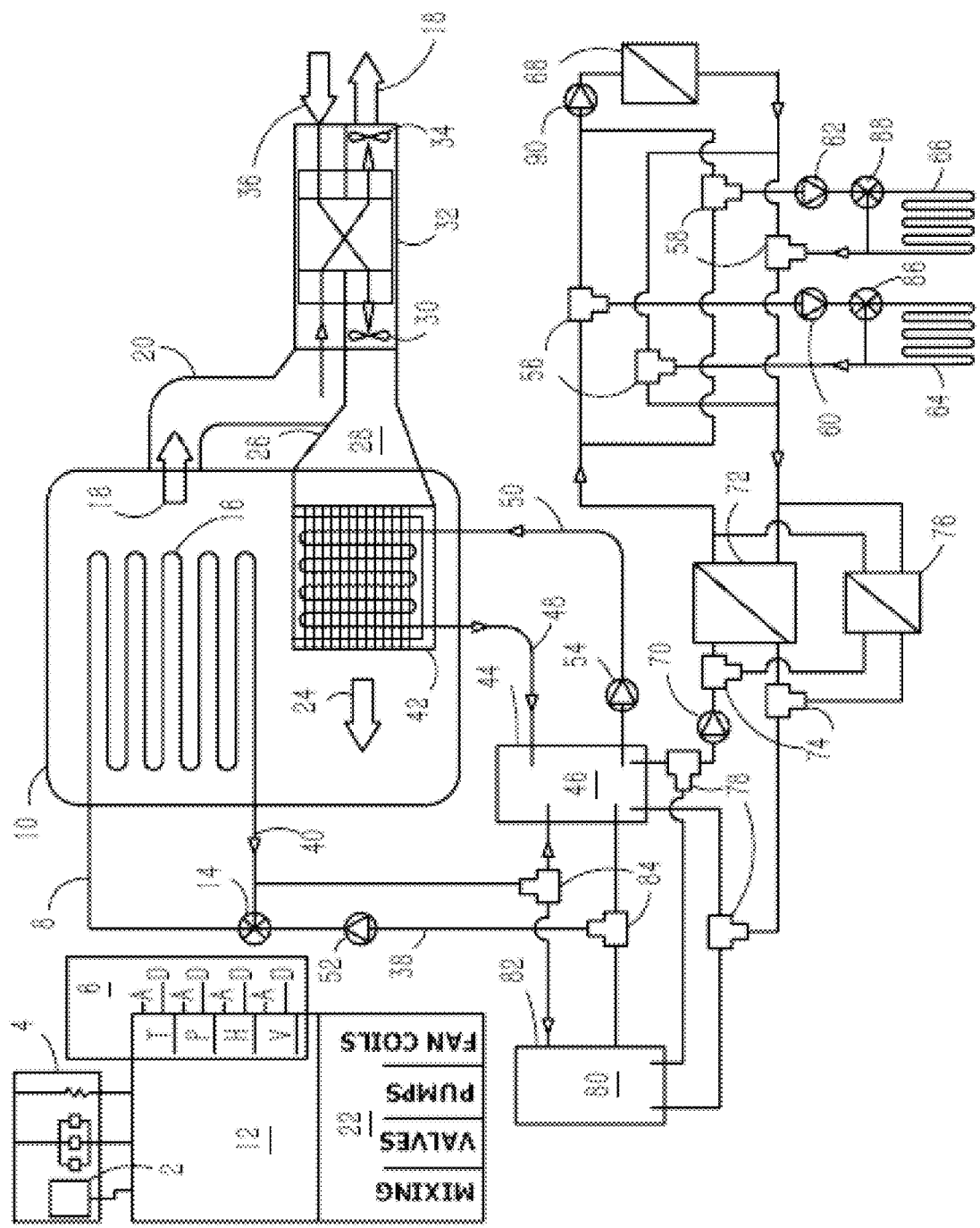
FIG. 1 is a process model diagram that shows the requisite control functionality and critical parameters of an embodiment of HBSC.

To assist in the understanding of the present disclosure the following Table Of Components and associated numbering found in the drawings is provided below.

| Table of Components | |
|---|---|
| Component | # |
| User Interface | 2 |
| Communications Module | 4 |
| Sensor Inputs | 6 |
| Mixed Radiant Supply Fluid | 8 |

-continued

Table of Components

| Component | # |
|---|---|
| Conditioned Space | 10 |
| Microprocessor Controller | 12 |
| Radiant Mixing Device | 14 |
| Thermally-Conductive Structure | 16 |
| Stale Exhaust Air | 18 |
| Air Duct Exhaust | 20 |
| Devices Controller | 22 |
| Conditioned Air | 24 |
| Air Duct Intake | 26 |
| Fresh Intake Air | 28 |
| Fresh Air Fan | 30 |
| Energy Transfer and Ventilation Device | 32 |
| Exhaust Air Fan | 34 |
| Fresh Air Supply | 36 |
| Hydronic Supply Fluid | 38 |
| Hydronic Return Fluid | 40 |
| Hydronic Coil-to-Air Heat Exchanger | 42 |
| Thermal Storage Temperature Sensor One | 44 |
| Thermal Storage One | 46 |
| Hydronic Coil Return Fluid | 48 |
| Hydronic Coil Supply Fluid | 50 |
| Hydronic Load Circulator | 52 |
| Hydronic-to-Air Circulator | 54 |
| Source 3-Way Control Valves One | 56 |
| Source 3-Way Control Valves Two | 58 |
| Source Side Circulator One | 60 |
| Source Side Circulator Two | 62 |
| Ground Heat Exchanger One | 64 |
| Ground Heat Exchanger Two | 66 |
| Process Heat Exchanger | 68 |
| Load Circulator | 70 |
| Heat Pump | 72 |
| Bypass 3-Way Control Valves | 74 |
| Source Heat Exchanger | 76 |
| Thermal Storage Source 3-Way Control Valves | 78 |
| Thermal Storage Two | 80 |
| Thermal Storage Temperature Sensor Two | 82 |
| Thermal Load 3-Way Control Valves | 84 |
| Source Mixing Device One | 86 |
| Source Mixing Device Two | 88 |
| Process Heat Circulator | 90 |
| Client Server Architecture | 400 |
| Client | 402 |
| Client | 404 |
| Client | 406 |
| Server | 408 |

DETAILED DESCRIPTION

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Technical Approach—Described in detail below is a low-cost standards-based integrated Hydronic Building Systems Control. One embodiment is based on the BACnet protocol and HBSC algorithms are hosted on commodity hardware developed for the smart phone market. HBSC provides interoperability between legacy and new HVAC equipment, and is designed using a process model which incorporates hydronic fan coils and high mass radiant floor hydronic heating and cooling incorporating ground source heat pumps source circulator control, process heat and solar thermal sources, ground heat exchanger passive cooling, and dew point tracking for high mass radiant cooling applications.

Referring now to the Figures, like reference numerals and names refer to structurally and/or functionally similar elements thereof, and if objects depicted in the figures that are covered by another object, as well as the tag line for the element number thereto, may be shown in dashed lines. FIG. 1 is a process model diagram that shows the requisite control functionality and critical parameters of an embodiment of HBSC. To simplify the control optimization strategy, HBSC utilizes the explicit process model shown in FIG. 1 to determine critical parameters. Since this approach is vendor and technology agnostic, HBSC provides direct control and interoperability through modulation of single or multi-stage legacy equipment while providing a path to accommodate emerging Variable Speed (VS) devices with onboard optimization. HBSC uses a model-based design with minimal sensed feedback for reduced cost, and operates more rapidly than direct search method approaches, which perturb physical process variables to reactively optimize system performance. Notwithstanding the above, one skilled in the art will recognize that individual components shown in FIG. 1 can be arranged in many different configurations, and that specific components may be different types of devices selected to meet specific requirements for a given structure. FIG. 1 should not be viewed in a limiting way, but as an exemplary embodiment of the features and functions as set out in the claims that follow.

HBSC Innovation Description and Sequence of Controls—Referring now to FIG. 1, HBSC is based on a model consisting of a combination of analog devices using a circulating fluid to heat or cool a Conditioned Space 10, such as a room in a home or an office in a building, or multiple conditioned spaces, in a Thermally-Conductive Structure 16, such as radiant floors, walls, and ceilings, or chilled beams.

The fluid may be used to transfer energy by circulating the fluid through a Hydronic Coil-to-Air Heat Exchanger 42 in combination with a device which moves air through Hydronic Coil-to-Air Heat Exchanger 42. The fluid may be water, propylene glycol, ethanol, methanol, or any other suitable fluid that is typically non-corrosive. In another embodiment, Hydronic Coil-to-Air Heat Exchanger 42 may be a dehumidifier, and air conditioning unit (mechanical vapor compression refrigeration equipment), an absorption chiller, or a heat recovery ventilator. The air moving device may be a fan, or Energy Transfer and Ventilation Device 32 such as an ERV, HRV, water-to-air heat pump, water-to-water heat pump, air-to-water heat pump, air conditioner, or dehumidifier.

Energy Transfer and Ventilation Device 32 uses two or more fans, such as Fresh Air Fan 30 and Exhaust Air Fan 34, to bring Fresh Air Supply 36 into Conditioned Space 10 while removing Stale Exhaust Air 18. Typical implementations utilize ventilation comprising Air Duct Intake 26 and Air Duct Exhaust 20. In this process, Energy Transfer and Ventilation Device 32 exchanges energy between the air flows (Fresh Air Supply 36 and Stale Exhaust Air 18), which includes water vapor in the air, causing a change in humidity. The air flow into the conditioned space is Conditioned Air 24 which differs from outside air based on interaction with Energy Transfer and Ventilation Device 32. The entering fluid to Hydronic Coil-to-Air Heat Exchanger 42 is Hydronic Coil Supply Fluid 50. The leaving fluid is Hydronic Coil Return Fluid 48. Hydronic Coil Supply Fluid 50 is pumped from Thermal Storage One 46 with Hydronic Coil-to-Air Circulator 54. The temperature of the fluid in Thermal Storage One 46 (typically a chilled fluid storage tank) is sensed by Thermal Storage Temperature Sensor One 44. The temperature of the fluid in Thermal Storage Two 80 (typically a heating fluid storage tank) is sensed by Thermal Storage Temperature Sensor Two 82.

When Hydronic Coil Supply Fluid 50 entering Hydronic Coil-to-Air Heat Exchanger 42 is sufficiently colder than the dew point of Fresh Intake Air 28, water will condense on Hydronic Coil-to-Air Heat Exchanger 42 causing Conditioned Air 24 to be dehumidified.

The fluid in Thermal Storage One 46 (typically cold) or Thermal Storage Two 80 (typically hot) may be used to transfer energy through Thermally-Conductive Structure 16. Typical structures utilize low or high mass mediums in which tubing is mounted or embedded. Applications include radiant floor, walls and ceilings, or chilled beams. The temperature of Mixed Radiant Supply Fluid 8 is controlled with Radiant Mixing Device 14 by modulating the mixed flow of Hydronic Supply Fluid 38 with Hydronic Return Fluid 40. Hydronic Supply Fluid 38 is pumped by Hydronic Load Circulator 52 from Thermal Storage One 46 or Thermal Storage Two 80 based on the position of the Thermal Load 3-Way Control Valves 84. In cooling mode, the Mixed Radiant Supply Fluid 8 is circulated at a temperature above dew point to prevent condensation in Thermally-Conductive Structure 16. Chilled fluid below dew point contained in Thermal Storage One 46, and used to dehumidify air in Hydronic Coil-to-Air Heat Exchanger 42, is mixed to a temperature above dew point to circulate in Thermally-Conductive Structure 16.

The source of chilling or heating for the fluids contained in Thermal Storage One 46 and Thermal Storage Two 80 may be active or passive. Active heating and chilling is provided from Heat Pump 72, or an active source containing Process Heat Exchanger 68 (typically a boiler, chiller, solar thermal array, combined heat and power unit (CHP or "cogeneration"), or an absorption chiller). Passive heating and chilling is provided from an open or closed loop Ground Heat Exchanger One 64 and Ground Heat Exchanger Two 66 or Process Heat Exchanger 68 for waste heat or cooling.

An open loop ground heat exchanger uses ground water directly as a heating or cooling medium, extracting and then discharging water to the ground. A closed loop ground heat exchanger, as depicted at Ground Heat Exchanger One 64 and Ground Heat Exchanger Two 66 utilizes piping embedded in the ground or surface water through which thermally-conductive fluid is circulated.

One embodiment utilizes a ground source heat pump, such as Heat Pump 72, for active chilling or heating Thermal Storage One 46 or Thermal Storage Two 80. Another embodiment utilizes an air source heat pump (not shown) without a requirement for a Ground Heat Exchanger One 64 and Ground Heat Exchanger Two 66. In chilling operation, Heat Pump 72 cools with Thermal Storage Source 3-Way Control Valves 78 directed to Thermal Storage One 46. In heating operation, Heat Pump 72 heats with Thermal Storage Source 3-Way Control Valves 78 directed to Thermal Storage Two 80. Load Circulator 70 moves fluid from Thermal Storage One 46 and Thermal Storage Two 80 through the load side heat exchanger contained within Heat Pump 72.

Heat Pump 72 may operate using an open loop or closed loop ground heat exchanger. In one embodiment, as shown in FIG. 1, Heat Pump 72 actively heats/chills using an electric vapor compression process with a closed loop ground heat exchanger comprised of Ground Heat Exchanger One 64 and Ground Heat Exchanger Two 66. This type of heat exchanger is known in the industry as the "source side" heat exchanger. While typical ground source heat pumps use one closed loop ground heat exchanger, the source side embodiment shown in FIG. 1 may use all or part of the ground heat exchanger, with and without utilizing heating or chilling from Process Heat Exchanger 68. The amount of flow through Ground Heat Exchanger One 64 versus Process Heat Exchanger 68 is a function of the position of Source 3-Way Control Valves One 56. The flow through Ground Heat Exchanger Two 66 is a function of the position of Source 3-Way Control Valves Two 58. Flow through Ground Heat Exchanger One 64 and Ground Heat Exchanger Two 66 is delivered by Source Side Circulator One 60, Source Side Circulator Two 62, and Process Heat Circulator 90. The fluid mixing between Ground Heat Exchanger One 64 and Ground Heat Exchanger Two 66 and Process Heat Exchanger 68 is the function of Source Mixing Device One 86 and Source Mixing Device Two 88.

Attaining the highest system energy efficiency determines the operation of the circulator pumps contained in Source Side Circulator One 60 and Source Side Circulator Two 62. At maximum capacity operation and utilization of Ground Heat Exchanger One 64 and Ground Heat Exchanger Two 66, all pumps in the Source Side Circulator One 60 and Source Side Circulator Two 62 are activated when Heat Pump 72 turns on. When Heat Pump 72 is equipped with a two-stage compressor, logic within the Microprocessor Controller 12 activates relays contained within Devices Controller 22 to affect operation of the circulator pumps contained in Source Side Circulator One 60 and Source Side Circulator Two 62. For multiple fixed speed pumps, a relay for each pump is activated to provide sufficient flow rate to Heat Pump 72 based on Microprocessor Controller 12 data. Factors affecting the source side required flow for Heat Pump 72 performance include entering water temperature from Sensor Inputs 6, the compressor output and heating or cooling mode demanded by Microprocessor Controller 12, and calculated performance data provided by the manufacturer and known to Microprocessor Controller 12. For multiple speed and variable speed pumps contained in Source Side Circulator One 60 and Source Side Circulator Two 62, digital output is provided by Microprocessor Controller 12 to one or both Source Side Circulator One 60 and Source Side Circulator Two 62 to meet required source side flow rate as calculated by Microprocessor Controller 12 to optimize system energy efficiency. One embodiment is a 0-10 volt input signal corresponding to 0-100% output pump capacity. When Ground Heat Exchanger One 64 and Ground Heat Exchanger Two 66 are utilized in split operation, as one for heating and one for cooling, Microprocessor Controller 12 will activate the respective Source Side Circulator One 60 and Source Side Circulator Two 62 at the pump capacity to meet the required source side flow rate for Heat Pump 72 to meet capacity demand.

For passive heating and cooling, Thermal Storage One 46 and Thermal Storage Two 80 are heated or cooled without engaging Heat Pump 72 operation. Ground Heat Exchanger One 64 and Ground Heat Exchanger Two 66 and Process Heat Exchanger 68 fluids bypass the Heat Pump 72. These fluids may be circulated directly into Thermal Storage One 46 or Thermal Storage Two 80, or transfer energy through Source Heat Exchanger 76 as shown in the embodiment of FIG. 1. Typical ground heat exchanger fluids are at low grade temperatures, so direct use in cooling is an appropriate application. Bypass 3-Way Control Valves 74 enable direct use of source side heat exchanger fluids bypassing Heat Pump 72. Load Circulator 70 affects flow between Thermal Storage One 46 or Thermal Storage Two 80 and Source Heat Exchanger 76 based on the position of Thermal Storage Source 3-Way Control Valves 78. When Source Heat Exchanger 76 is utilized, the Source Side Circulator One 60 and Source Side Circulator Two 62 or Process Heat Circulator 90 must also be activated to establish heat transfer across Source Heat Exchanger 76.

The proposed innovation is a control for a hydronic building system for space cooling and heating. The control system for controlling a hydronic building system for space cooling and heating consists of at least one of a User Interface 2; Communications Module 4; Sensor Inputs 6 for sensing temperature, atmospheric pressure, humidity, and velocity; Microprocessor Controller 12; and Devices Controller 22. These devices can operate as separate modules or integrated components.

User Interface 2 provides functionality for setting system operating parameters, observing system operations, and controlling system performance. Typical embodiments range from a simple menu selection for input with numerical output, to dynamic graphical display which changes based on digital and analog output. The primary embodiment is a graphical user interface typically utilized for smart phones and content-rich portable computing devices. In this embodiment, User Interface 2, Communications Module 4, and Microprocessor Controller 12 are hosted on a single device.

In another embodiment, User Interface 2 is a separate device, or a software application residing on a general purpose computing platform and operating system. Communications Module 4 enables communications between User Interface 2, Microprocessor Controller 12, and devices external to HBSC. External weather and climate data are provided to HBSC through Communications Module 4. Typical embodiments are based on industry standard building automation protocols, including BACnet, Modbus, and Lon Works. Microprocessor Controller 12 hosts the software algorithms containing system functionality. This compact embedded microprocessor system accepts digital input from User Interface 2 and digital/analog input from Sensor Inputs 6, and generates digital output to User Interface 2, Communications Module 4, digital and analog components within the Devices Controller 22.

To reduce development costs and increase manufacturing feasibility, open-source software and hardware is used, including Microprocessor Controller 12, device operating system, shared libraries, and BACnet communications protocol. Open protocols are standardized communications and network layers published for use by any device manufacturer. HBSC architecture is designed to work in concert with commercial building automation systems. In one embodiment, Microprocessor Controller 12 processes sensor data, applies algorithms to extract control outputs, and communicates those outputs via standard architectures, such as a BACnet link in one embodiment. Software functionality includes a minimal device operating system, shared libraries, and support for industry-standard communications. Microprocessor Controller 12 can operate as a stand-alone controller or provide output to the building automation system via BACnet, to execute algorithms for device control. The Physical Communications Layer is an industry standard, such as 100 Base—T Ethernet between HBSC, the building automation system, and a network router. In one embodiment, the hardware consists of a series of microprocessors based on advanced Reduced Instruction Set Computing (RISC) machine cores, which are comparable to hardware available in recent smart phones and hosted using methods developed by the DOE National Renewable Energy Laboratory. In this embodiment, a modified Linux operating system is optimized for embedded applications processing.

SENSORS—Sensor Inputs 6 provide analog and digital input for system control. Control devices contain at least one member of the group consisting of sensor inputs for temperature, pressure, relative humidity, air and fluid velocity, and real time energy use. From these inputs, methods known in the art are used to calculate dew point, energy and thermal production (kWh and Btu's) and energy use by component and process. Control decisions use algorithms which provide the highest system energy efficiency as measured by energy produced divided by energy used over a time period. In one embodiment of the device controlling HBSC system as shown in FIG. 1, temperature sensors are located in:

Conditioned Space 10;
Thermally-Conductive Structure 16;
the outside air;
the input and output of Radiant Mixing Device 14;
Source Mixing Device One 86;
Source Mixing Device Two 88;
Thermal Storage One 46;
Thermal Storage Two 80;
Source 3-Way Control Valves One 56;
Source 3-Way Control Valves Two 58;
Bypass 3-Way Control Valves 74;
Thermal Storage Source 3-Way Control Valves 78;
Thermal Load 3-Way Control Valves 84;
Hydronic Supply Fluid 38;
Hydronic Return Fluid 40;
Hydronic Coil Return Fluid 48;
Hydronic Coil Supply Fluid 50;
demand and source supply and return on Heat Pump 72, Process Heat Exchanger 68, Heat Pump 72, and Source Heat Exchanger 76; and
supply and return to the Ground Heat Exchanger One 64 and Ground Heat Exchanger Two 66.
Fluid velocity sensors are located in:
Hydronic Load Circulator 52;
Hydronic-to-Air Circulator 54;
Source Side Circulator One 60;
Source Side Circulator Two 62;
Load Circulator 70; and
Process Heat Circulator 90.
Air velocity sensors are located in:
the supply and return fans of Fresh Air Fan 30;
Exhaust Air Fan 34;
Conditioned Air 24, and
Stale Exhaust Air 18.

Humidity and atmospheric pressure sensors are located in Conditioned Space 10. Devices which consume power during system operation are equipped with watt/hr meters. These include circulators (Hydronic Load Circulator 52, Hydronic-to-Air Circulator 54, Source Side Circulator One 60, Source Side Circulator Two 62, Load Circulator 70, and Process Heat Circulator 90); fans (Fresh Air Fan 30, Exhaust Air Fan 34); and Heat Pump 72. Using known methods, this sensor configuration is sufficient to calculate component and system energy efficiency in real time, and calculate dew point in real time in Conditioned Space 10 and Thermally-Conductive Structure 16. This information is used by HBSC algorithms to provide control outputs to digital and analog devices. System energy efficiency overrides component energy efficiency when energy savings is highest at the system level. The overall system power usage is determined from sensors. The component actual power usage is determined from sensors, or component calculated power usage using the component rated efficiencies (EER/COP) provided by the manufacturer using one or more performance parameters.

Devices Controller 22 accepts Microprocessor Controller 12 output to affect control of digital or analog devices including mixing (Radiant Mixing Device 14, Source Mixing Device One 86, and Source Mixing Device Two 88); 3-way valves (Source 3-Way Control Valves One 56, Source 3-Way Control Valves Two 58, Bypass 3-Way Control Valves 74, Thermal Storage Source 3-Way Control Valves 78, and Thermal Load 3-Way Control Valves 84); Heat Pump 72; Hydronic Coil-to-Air Heat Exchanger 42, Fresh Air Fan 30, and components which lack digital onboard input capabilities. Devices Controller 22 provides binary (on/off) control signals, or variable control signals (such as a 01-10 volt signal).

User Interface 2, Communications Module 4, Microprocessor Controller 12, and Devices Controller 22 are able to implement the controls strategy which optimizes system energy efficiency. The software and hardware of these four components have the flexibility to implement a wide variety of known control strategies. These include set point control, setback control, reset control, low and high limit control, LEAD/LAG control, high/low signal select, and averaging control. The control logic is implemented as (1) an open loop control in which decisions are based only on the model of how the system should operate; or (2) as a closed loop control in which the result of an output is fed back to the controller as an input. To simplify installation and commissioning, HBSC contains preset algorithms known to produce the highest system energy efficiency. An example is modulating the Source Side Circulator One 60 and Source Side Circulator Two 62 as a linear function to the compressor speed of Heat Pump 72. All of these settings of system operating parameters are stored in memory in Microprocessor Controller 12.

COOLING OPERATION—Conditioned Space 10 and Thermally-Conductive Structure 16 are at a temperature above the desired comfort set point temperature in Conditioned Space 10. HBSC is programmed with staged priority cooling and ventilation set to multiple stages, e.g., Stage 1—Energy Transfer and Ventilation Device 32; Stage 2—radiant floor cooling through Thermally-Conductive Structure 16; and Stage 3—forced air cooling through Hydronic Coil-to-Air Heat Exchanger 42.

If fresh air ventilation is required within Conditioned Space 10 or if the outdoor air temperature is lower than the desired comfort set point in Conditioned Space 10, HBSC activates the Energy Transfer and Ventilation Device 32 to circulate cool outside air in Conditioned Space 10. If the outside air is cooler than Conditioned Space 10 by a preset offset temperature and cooling demand is met within a preset time period, Stage 1 cooling is the only means activated. If Stage 1 cooling does not meet cooling demand within a preset time period or to meet programmed response requirements such as a change in temperature over time, Stage 2 cooling is activated.

Stage 2 cooling extracts heat from Conditioned Space 10 using the Thermally-Conductive Structure 16. Based on sensor input for temperature, relative humidity, and atmospheric pressure, Microprocessor Controller 12 calculates the dew point of Thermally-Conductive Structure 16 and Conditioned Space 10. Microprocessor Controller 12 adds an offset temperature to the higher of these dew points, which determines Mixed Radiant Supply Fluid 8. The sources for chilled fluid include Thermal Storage One 46, Ground Heat Exchanger One 64 and Ground Heat Exchanger Two 66, or Process Heat Exchanger 68. In one embodiment, Process Heat Exchanger 68 is eliminated and Ground Heat Exchanger One 64 and Ground Heat Exchanger Two 66 fluids are used directly to cool the Thermally-Conductive Structure 16. Heat Pump 72 can be activated to chill Thermal Storage One 46 if no source is at or below the required Mixed Radiant Supply Fluid 8 temperature. If either Ground Heat Exchanger One 64 or Ground Heat Exchanger Two 66, or Process Heat Exchanger 68 are at a lower temperature than the required Mixed Radiant Supply Fluid 8 temperature, HBSC activates Bypass 3-Way Control Valves 74 to bypass Heat Pump 72, activates Thermal Storage Source 3-Way Control Valves 78 to Thermal Storage One 46 position, and activates Load Circulator 70 and respective Source Side Circulator One 60, Source Side Circulator Two 62, or Process Heat Circulator 90 to chill Thermal Storage One 46. When Thermal Storage Temperature Sensor One 44 senses that Thermal Storage One 46 temperature is lower than the desired set point for the mixed radiant supply fluid, HBSC activates Thermal Load 3-Way Control Valves 84 to Thermal Storage One 46 setting and activates Hydronic Load Circulator 52. Radiant Mixing Device 14 is modulated to maintain the desired Mixed Radiant Supply Fluid 8 temperature. If the source fluid maintains the set point temperature, the Stage 2 cooling continues until the comfort temperature in Conditioned Space 10 is met. If during Stage 2 cooling, HBSC determines that a chilled Mixed Radiant Supply Fluid 8 temperature cannot meet cooling demand, or that the required Mixed Radiant Supply Fluid 8 temperature that meets cooling demand is below the dew point, Stage 3 cooling is activated.

Stage 3 cooling requires Thermal Storage One 46 tank temperature to be less than dew point in order to condense moisture on the fan coil and affect dehumidification of air passing through Hydronic Coil-to-Air Heat Exchanger 42. Using the same logic finding a source in Stage 2 cooling, HBSC activates Stage 3 cooling of Thermal Storage One 46 based on the source providing the highest cooling thermal output at the lowest energy input. If Process Heat Exchanger 68 or Ground Heat Exchanger One 64/Ground Heat Exchanger Two 66 fluids are at a higher temperature than the required Thermal Storage One 46 temperature, HBSC directs Bypass 3-Way Control Valves 74 to the Heat Pump 72 position, selects the source heat exchanger fluid at the lowest temperature, and activates the lowest Heat Pump 72 compressor setting to meet the chilled water demand. This setting can be pre-programmed as an open loop control, or calculated in real time using feedback from Thermal Storage Temperature Sensor One 44 response over a set time period. As the temperature drops in Thermal Storage One 46, Radiant Mixing Device 14 modulates the mixing of Hydronic Return Fluid 40 to maintain Mixed Radiant Supply Fluid 8 above the set point above dew point.

When Heat Pump 72 cools Thermal Storage One 46 below the temperature required for air coil condensation, HBSC activates Hydronic-to-Air Circulator 54 to circulate Hydronic Coil Supply Fluid 50. If the energy transfer and ventilation is not already operating, HBSC turns on Hydronic-to-Air Circulator 54 to the lowest fan setting which provides sufficient ventilation and maximum dehumidification across the fan coil. As Fresh Intake Air 28 passes through Hydronic Coil-to-Air Heat Exchanger 42, the resultant Conditioned Air 24 will be cooled and have less humidity than Fresh Air Supply 36. With continuous operation, this process will lower the relative humidity and calculated dew point in Conditioned Space 10. The lower dew point in Thermally-Conductive Structure 16 will enable a lower Mixed Radiant Supply Fluid 8 temperature making Thermally-Conductive Structure 16 more effective as a cooling heat exchanger.

Using historic data, climate data, or real time weather data, the staging and set points of these options can be adjusted to predict set points for optimal comfort, or stage processes for optimal system energy efficiency. HBSC incorporates thermal mass of Thermally-Conductive Structure 16 by creating LEAD/LAG times for temperature response based on structure.

In another embodiment, Heat Pump 72 can chill Thermal Storage One 46 while rejecting heat to Thermal Storage Two 80 or Process Heat Exchanger 68 without using Ground Heat Exchanger One 64 or Ground Heat Exchanger Two 66. In low grade temperature applications such as pool heating while cooling a chilling tower, the system energy efficiency is twice that of a heat pump heating or chilling while operating with the ground heat exchanger.

HEATING OPERATION—It is known that radiant floor heating processes are mature art and condensation on Thermally-Conductive Structure 16 is not a consideration. HBSC provides innovations beyond current art to increase user comfort, design flexibility, and energy efficiency improvements.

HBSC uses a reset curve to determine a set point to meet heat demand in Conditioned Space 10. This set point is based on outside air temperature, Conditioned Space 10 air temperature, Thermally-Conductive Structure 16 temperature, and desired comfort set point. In one embodiment, HBSC uses weather forecast data to modify set points for efficiency and comfort using known algorithms such as such as pre-cooling prior to forecast peak demand loads. Similar to cooling sequences, HBSC accepts temperature sensor inputs to determine highest system energy efficiency based on passive heat from Process Heat Exchanger 68 or Ground Heat Exchanger One 64 or Ground Heat Exchanger Two 66, or active heating using Heat Pump 72. If Heat Pump 72 is the source of high-grade heat, HBSC could select one or more Ground Heat Exchanger One 64 or Ground Heat Exchanger Two 66 or Process Heat Exchanger 68 as a source fluid providing the highest Heat Pump 72 heating efficiency. Using known algorithms and Heat Pump 72 manufacturer performance data, efficiency increases when providing hotter source water in heating mode and cooler source water in cooling mode within specific operating ranges. This method may be overridden when system energy efficiency is higher at source temperatures different than that temperature for highest Heat Pump 72 efficiency when considering all system components.

In one embodiment, Process Heat Exchanger 68 is a high temperature solar thermal array. HBSC would select this source for passive heating by activating Source 3-Way Control Valves One 56 and Source 3-Way Control Valves Two 58 to position Process Heat Exchanger 68, activating Bypass 3-way Control Valves 74 to bypass Heat Pump 72, and activating Thermal Storage Source 3-way Control Valves 78 to the Thermal Storage Two 80 position. If the solar thermal production reduces Process Heat Exchanger 68 temperature below the required Mixed Radiant Supply Fluid 8 temperature, but at a temperature higher than the Ground Heat Exchanger One 64 or Ground Heat Exchanger Two 66, Heat Pump 72 would be activated in heating mode and operating against Process Heat Exchanger 68 as the source.

If this source continued to drop in temperature below that of Ground Heat Exchanger One 64/Ground Heat Exchanger Two 66, HBSC would affect the valve and pump positions to operate Heat Pump 72 in a conventional configuration with the ground heat exchangers.

Ground Heat Exchanger One 64/Ground Heat Exchanger Two 66 may be monolithic, or separate into one or more zones. The embodiment shown in FIG. 1 shows two separate ground heat exchanger zones. This number of zones can be increased by adding a dedicated source circulator (such as Source Side Circulator One 60/Source Side Circulator Two 62) and source mixing device (such as Source Mixing Device One 86/Source Mixing Device Two 88) to additional ground heat exchanger zones. These zones can serve as thermal energy storage for the overall system moving energy from the Thermal Storage One 46/Thermal Storage Two 80) or Process Heat Exchanger 68. The thermal storage can either be chilling or heating high thermal mass. In the case of Process Heat Exchanger 68 representing a solar hot water thermal array, Ground Heat Exchanger One 64/Ground Heat Exchanger Two 66 can store excess heat from the solar thermal system to address a future thermal need. Similarly, heat extracted from Conditioned Space 10 via Thermally-Conductive Structure 16 and rejected to Thermal Storage Two 80, can be extracted from Thermal Storage Two 80 and sent to Ground Heat Exchanger One 64 or Ground Heat Exchanger Two 66.

The application of HBSC is not limited to radiant floor applications. Anywhere that the embodiment refers to Thermally-Conductive Structure 16, another embodiment for the hydronic distribution is to a hydronic fan coil similar to the function of Hydronic Coil-to-Air Heat Exchanger 42. In commercial buildings, the embodiment of the hydronic distribution to the conditioned space is to a thermally conductive structure, which involves radiant low or high mass structures, hydronic fan coils, or variable air velocity hydronic fan coils.

Control Algorithm Optimization Beyond the Current Art—HBSC implements innovative algorithms that reduce building energy use at a substantially lower cost than the energy saved. One embodiment is hosted on a physical microprocessor based on low-cost commodity hardware developed for the smart phone industry.

Figure 2:
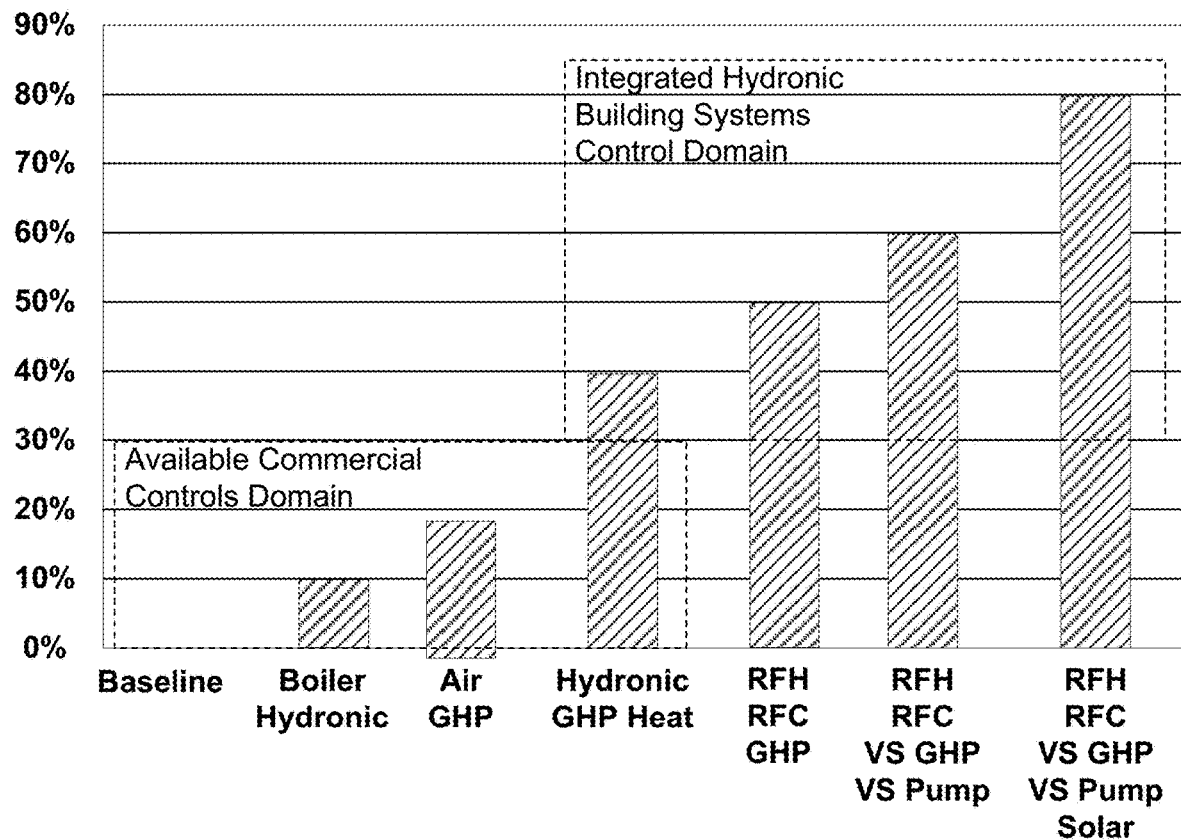
FIG. 2 shows a bar graph of HBSC energy savings potential compared to a baseline HVAC system.

HBSC energy savings potential increases substantially when advanced GHP equipment and high mass hydronic architecture are integrated in a holistic design. FIG. 2 illustrates controls potential to reduce energy based on equipment selection and distribution system, as compared to a baseline gas forced-air heating system with conventional outdoor direct exchanger vapor compression refrigeration.

The major technology gaps overcome by HBSC include:
1. Implementing operating parameters for RFC and humidity control for multiple climate zones, and algorithms which provide the highest system energy efficiency for tracking dew point and actively controlling humidity;
2. Meeting the functional requirements and metrics by implementing the sequence of controls and software for the proposed hydronic systems architecture; and
3. Deploying optimization algorithms for highest system energy efficiency during GHP partial and full load conditions, for Water-to-Water and Water-to-Air GHPs, equipped with single stage, two-stage, and variable speed compressors, and the linear control of fixed, multiple, and variable speed source circulators.

Figure 3:
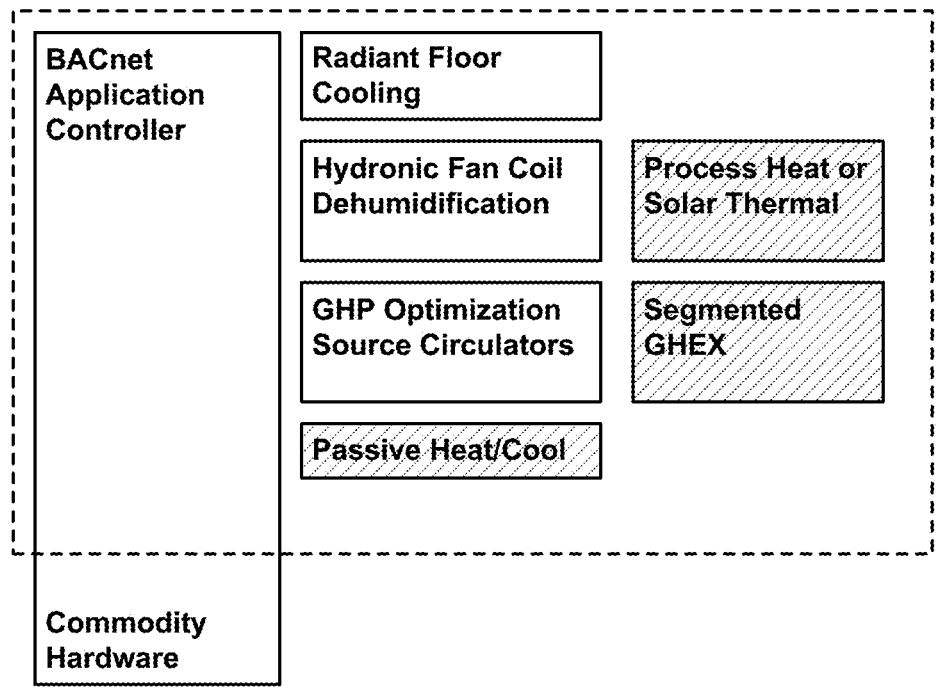
FIG. 3 shows the technology gaps addressed by HBSC.

These technology innovations are illustrated in FIG. 3. The functionality defined by the shaded areas represents algorithms for passive heating and cooling potential. HBSC algorithms use a conceptual model which implements a hydronic design providing interoperability between GHPs and alternative thermal heating and cooling sources. Traditional control architectures lack interoperability and innovation. Controls are typically designed to operate one device. In residential applications, a dedicated thermostat controls the furnace, a surface mounted aqua stat controls the hot water heater, a switch controls the bath fan, etc. These controls are wired using industry standard least-common-denominator bus connections for basic heat, cool, or fan which are not designed for the highest performance. One control unit does not know the existence of, or the capabilities of, another control unit or equipment within the home or building. While commercial applications may operate multiple devices, the controls logic and features are similar to residential systems. As equipment or new functions are added, the overall system resembles a jigsaw puzzle of increasing complexity where potential energy improvements are limited to the interoperability (or lack thereof) with existing infrastructure. In new construction involving commercial buildings with advanced features, dedicated controls contractors must write custom code to provide the links between disparate equipment, sensors, and controls. In general, these DDC programmers lack the knowledge to optimize component and system efficiencies.

Figure 4:
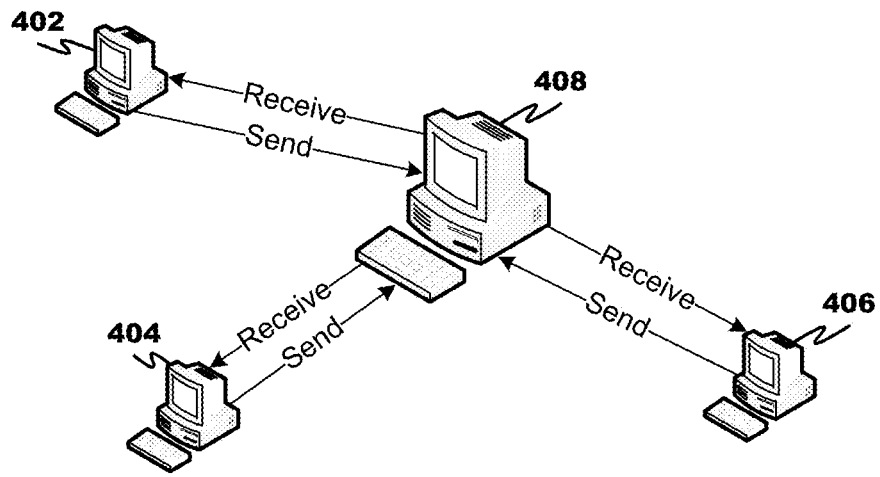
FIG. 4 shows a client-server computing architecture applicable to HBSC.

By applying client-server computing architectures, such as shown in FIG. 4, to building controls, HBSC overcomes these interoperability limitations. HBSC is based on a model representing the potential heating and cooling and ventilation processes available to meet user requirements. A common Client-Server Architecture 400 provides interoperability to legacy and new equipment. Rather than requiring new equipment to fit into the puzzle created by the existing infrastructure, the new equipment must comply with a common systems architecture standard. The complexity of the system is reduced to common application programming interfaces. Quite simply, any Client (a control) 402/404/406 should communicate to any Server (HVAC equipment) 408. As proven with information technology (IT) systems, Client-Server Architectures 400 are powerful.

One HBSC embodiment is a building controls architecture based on BACnet, a national and international standard proven in commercial applications and readily available. One market barrier to BACnet controls is the high cost of BACnet-compatible hardware processors. The lowest cost controls platform is one which has the largest worldwide market share. One embodiment to reduce the hardware cost of this processor is to host it on a RISC-based smart phone platform.

Figure 5:
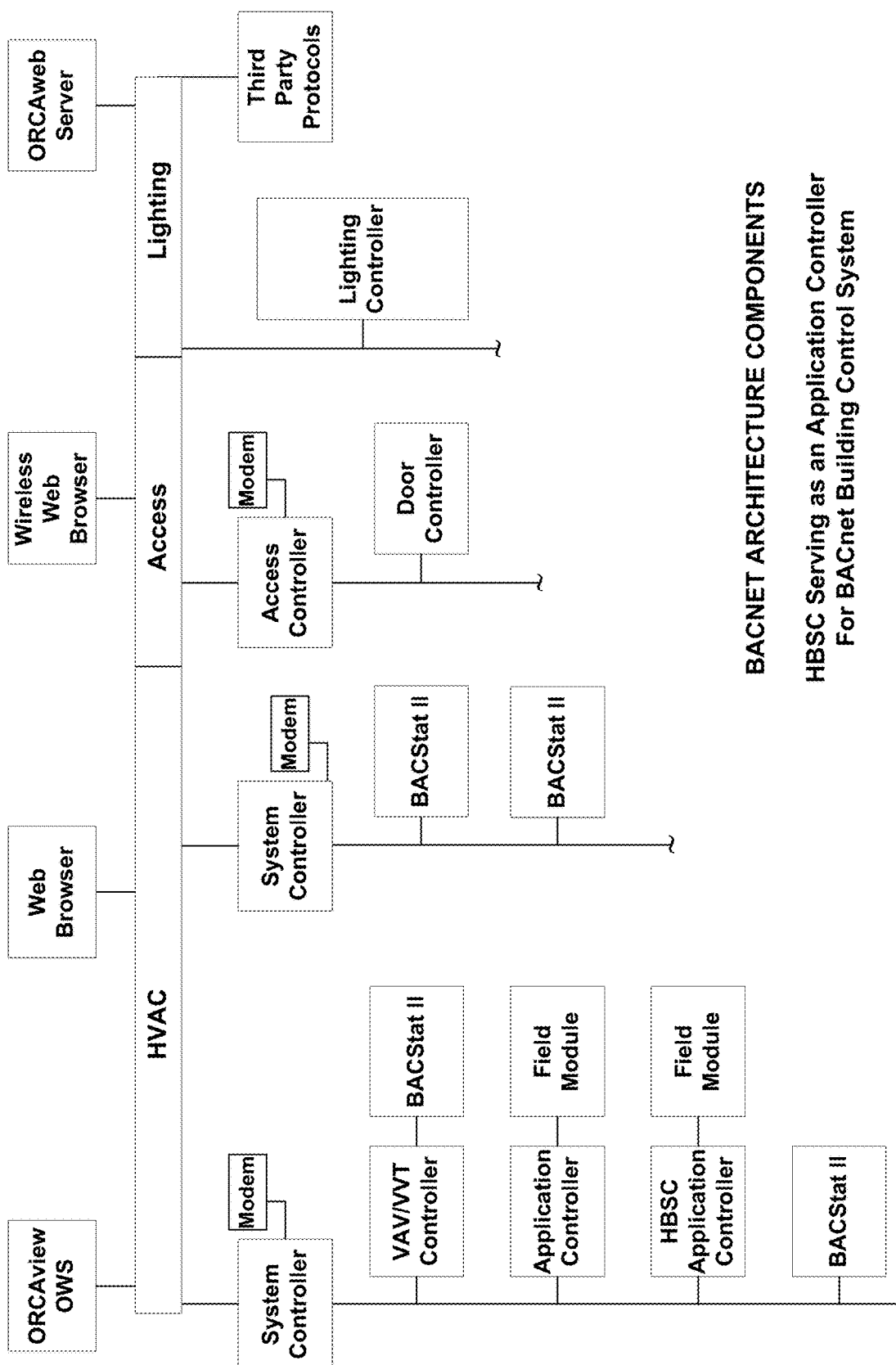
FIG. 5 shows a HBSC device serving as an application controller in an enterprise building automation system.

BACnet-compatible algorithms are ported to a commodity hardware microprocessor platform developed to serve the smart phone industry. As shown below in FIG. 5, a HBSC device will serve as an application controller within a larger network, or as a low-cost control for standalone applications.

HBSC software implements process control for a functional model of a generic building heating, cooling, and hot water system. The model has functions found in traditional buildings and advanced features that implement controls technology unavailable today. The basic functionality uses best practices algorithms known in the art for the control of traditional equipment for the production of hot water, chilled water, and ventilation equipment. Integrated systems capabilities make HBSC innovative. While using known algorithms, the implementation is unique with advanced hydronic features unavailable in controls today. Capabilities include dew point tracking with humidity control, which enables radiant floor cooling implementations, and direct use of solar thermal fluids for heating, or ground heat exchanger fluids for passive cooling. For the control of legacy and new GHP equipment, HBSC controls the source circulators in a linear relationship to compressor demand to optimize system performance.

HBSC has the collective potential to increase the Seasonal Performance Factor for the Heating System ($SPF_{HS}$) up to 30% over traditional GHP designs using conventional controls. When installed with high mass radiant cooling, the system energy efficiency increases to 40% over conventional forced air GHP systems. These gains are derived from the effectiveness of the radiant floor infrastructure and the lower condenser temperatures within the GHP. RFC systems require twice the tubing density (six inches on-center spacing) of radiant floor heating systems. As compared to heating, RFC requires a higher volume of heat transfer fluid (usually water) which increases thermal mass and system lag time (time period for fluid to complete one circuit through the distribution system), while decreasing hydronic circulation flow rate which reduces circulator energy. Embedded in a structural concrete slab or lightweight concrete topping, a high mass radiant floor configured for cooling is a highly efficient heat transfer medium. The tubing density required for a RFC heat exchanger increases the heat transfer coefficient and reduces the mean temperature difference. With the same inlet temperature and an increased flow rate through the GHP, the required mean temperature differential can be maintained with a lower condensation temperature. For the GHP condenser in heating mode, this means a lower average temperature level and thus a lower condensing pressure and reduced compressor work. Designing the hydronic heating system for the supply temperature of 90 degrees F. at the Design Outdoor Air Temperature (DOAT), instead of the more common 125 degrees F., will increase the $SPF_{HS}$ by approximately 40% (using the estimate that COP increases by 2% for each 1-degree K of lowered condensation temperature).

Since the thermal mass of the radiant floor will affect the cyclic behavior of the heat pump and temperature level of the system, it has the effect of lowering condensation temperatures even further. Traditionally, W-A GHPs with Electronically Commutated Motor (ECM) fans have a higher ARI COP rating than W-W GHPs. The $SPF_{HS}$ for low mass intermittent systems operation is 3% higher than high mass systems. This is due to the lower supply temperatures during compressor operation. However, low mass systems increase compressor cycling and contribute to user thermal discomfort caused by rapid changes in air temperatures between cycles. High thermal mass increases the system lag time. An example of low thermal mass radiant structures is PEX tubing which is attached to a low mass structure such as floor sheathing or wall paneling. A high mass structure involves embedding the PEX tubing (or any other type of appropriate piping) in concrete, light weight concrete, gypsum, or related high-density material which creates lag time when heating or cooling due to the mass of the material.

Figure 6:
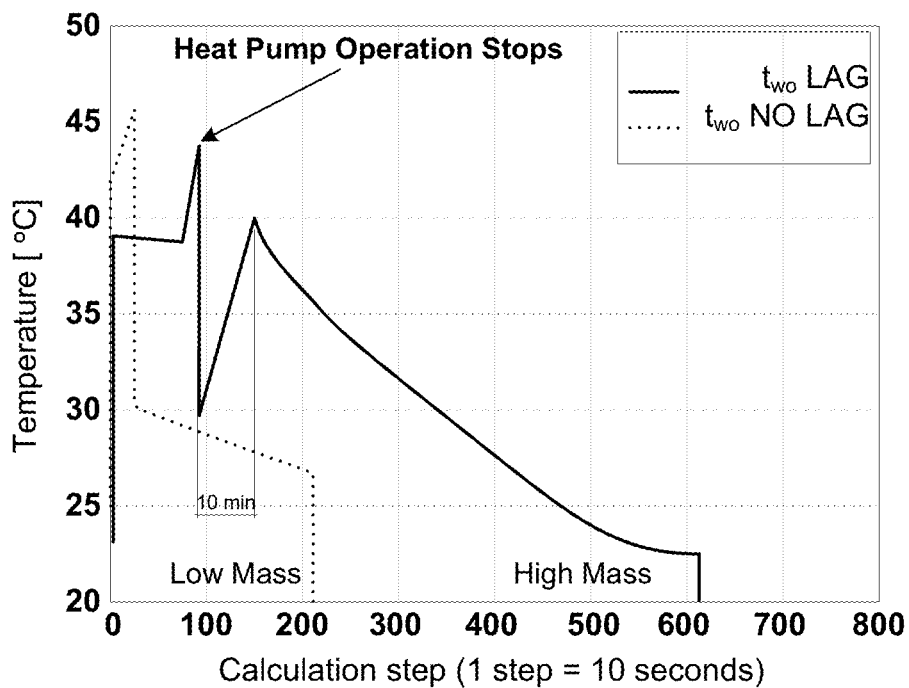
FIG. 6 shows a comparison of temperature levels for a radiator system with no lag time and ten minutes lag time.

A GHP equipped with a single stage compressor operating at full capacity and supplying a radiant hydronic system with a ten-minute lag time increases $SPF_{HS}$ by 5% versus a radiator system with no lag time. This is shown in FIG. 6.

The $SPF_{HS}$ increases with increasing lag time because the average supply temperature is reduced during the compressor on-time. The plateau at the beginning of the cycle depicted by the solid line is due to lag time. The increase in $SPF_{HS}$ is optimal when a single stage W-W GHP is sized at a capacity which is 70-80% of the peak building demand at the DOAT.

While radiant heating algorithms are mature, the RFC optimization and control approach implemented in HBSC represents a significant advancement in the state of the art. HBSC is unique in the comprehensive and discrete control of an integrated system used in the process model and containing radiant floor cooling with dynamic dew point tracking and active humidity control, dual process heating and cooling sources, ventilation using a hydronic coil in line with energy recovery, and segmented ground heat exchangers to utilize alternative energy sources and optimize GHP and system performance. The innovative control enables deployment of this functionality as stand-alone capabilities, or as part of an integrated systems design as described in the first embodiment.

Hydronic Building Systems Control—Functionality And Benefits

1. Enable Radiant Floor Cooling With Humidity Control Functionality—Peak grid demand is driven by building cooling loads. Reducing peak cooling loads reduces grid energy use. RFC reduces cooling system energy by 17%-42% depending on climate zone, operates at higher distribution efficiencies than forced air, enables personal comfort space zoning, limits terrorist intrusion vulnerabilities of forced-air HVAC systems, and inherently eliminates the health risk from fatal infectious diseases caused by gram negative, aerobic bacteria (such as *Legionella*). RFC has the capacity to remove 12-14 Btu/h/ft$^2$ sensible gain and 25-32 Btu/h/ft$^2$ of radiant heat gain in spaces with direct solar exposure, such as large glass atriums. Using radiant roll-out mat installation methods, cross-linked polyethylene (PEX) tubing embedded in new construction concrete slabs is one-half the first cost of forced air ductwork. Existing buildings with installed high mass radiant floor heating can be upgraded to RFC at minimal cost. To avoid condensation in RFC applications, dew point sensing controls are required. RFC controls are available to control set cooling water temperature based on dew point, though these controls lack the functionality to actively control humidity. HBSC extends the art by providing this capability.

The primary function is to control cooling in a thermally-conductive structure, such as RFC or chilled beams. Radiant heating algorithms will use conventional methods. Zone sensors provide temperature, atmospheric pressure (or, the atmospheric pressure is accounted for by pre-programming in the algorithms, eliminating the need for atmospheric pressure sensors), and relative humidity data to determine a system dew point, and to set a supply water temperature which prevents condensation within the structure. When indoor humidity is low, wet bulb gain is negligible. With RFC, latent heat is removed by an air conditioning and ventilation system which incorporates air velocity sensing. In dry climates, a separate air conditioning system may not be required, as a chilled W-A coil used in conjunction with the VAV or ERV/HRV can provide limited latent heat extraction and dehumidification. In these applications, the control must provide chilled water below dew point to the W-A coil for dehumidification, while mixing RFC water to an offset temperature above dew point for use in the high mass thermally-conductive structure.

Radiant cooling systems are particularly effective at reducing direct solar heat gain on indoor floor surfaces. This is particularly relevant to passive solar homes where the design intentionally provides full shade in the summer and full sun in the winter. The high thermal mass of radiant heated floors exposed to direct solar heating tends to overheat the conditioned space. In winter months with mild outdoor air temperatures and a very efficient building envelope, high performance homes tend to overheat in mid-day with low sun angles. A radiant floor cooling system has the ability to directly extract infrared heat gains from the thermally conductive structure to prevent overheating in this scenario. Heat extracted for cooling is utilized in the integrated system to provide immediate heating or stored for future use.

Figure 7:
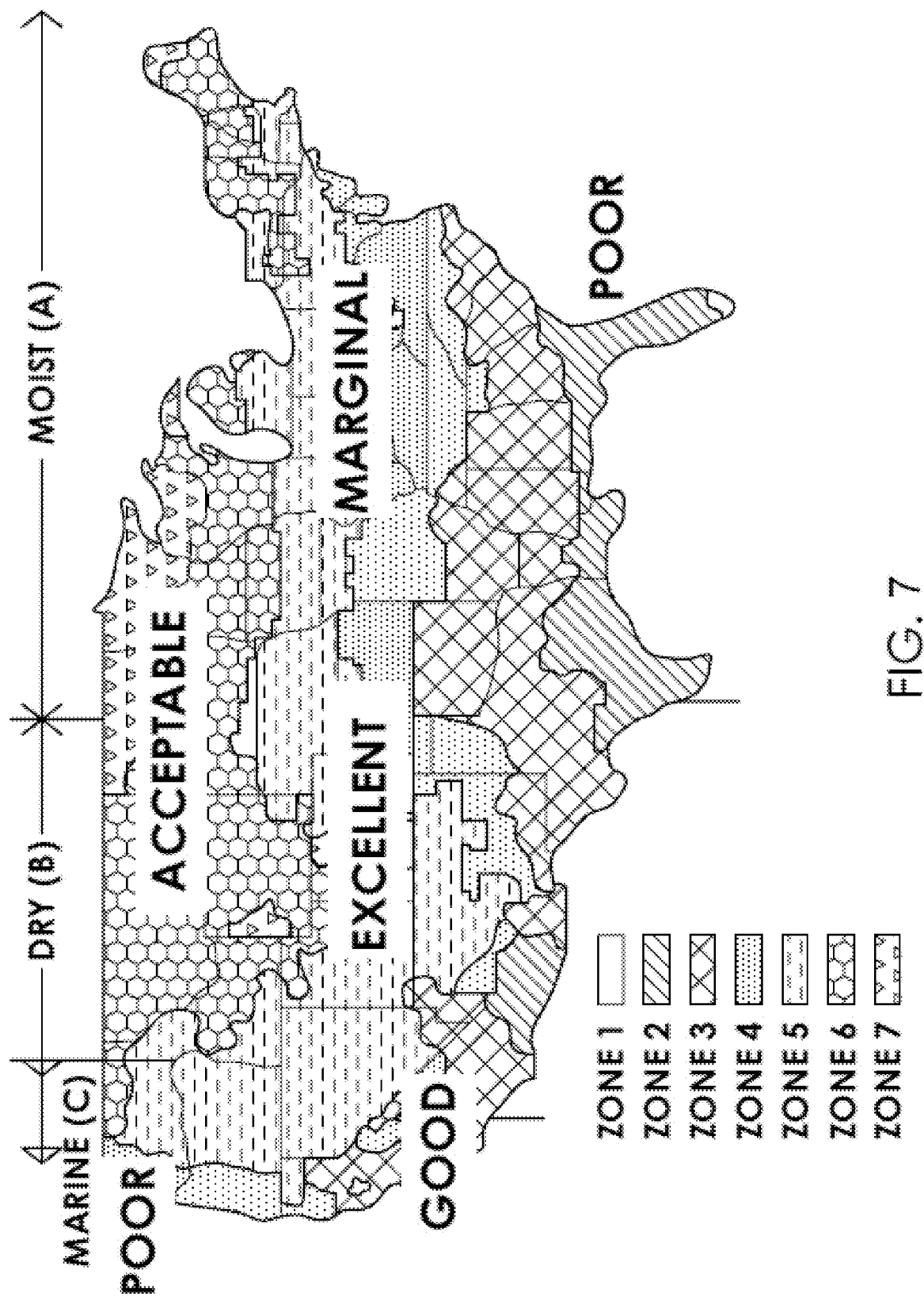
FIG. 7 shows the predicted radiant floor cooling efficiency for U.S. climate zones.

The efficiency of radiant cooling is limited by latent heat loads. FIG. 7 depicts an estimate of RFC potential within U.S. climate zones.

2. Implement Dual Process Heating Cooling Applications—Moving heat is usually more efficient than converting fuel or electricity to generate heat or cooling. Heat pumps inherently "move heat." The COP of a GHP doubles when the heat pump moves heat directly from a chilling source to a heating source without a ground heat exchanger. High mass hydronic systems operate at moderate temperatures, thus increasing equipment efficiency and providing an opportunity for direct use of passive heating or cooling with thermal storage. HBSC algorithms implement model-based passive strategies including night cooling, direct use of ground-coupled hydronic loops bypassing the chiller, segmenting the ground source heat exchanger to serve as a heat sink, ice storage, and night fluid or pre-cooling functionality. HBSC provides interoperability between traditional air cooling and dehumidification equipment, hydronic chillers/boilers, direct digital and analog to GHPs with innovative features, and accepts sensors for temperature, pressure, humidity, and air velocity and water flow. The controller selects an active or passive source based on set point heat and cooling source temperatures to meet building loads. It can operate as a standalone controller for residential applications, or serve as an industry standards-compliant subsystem controller for complex residential and commercial applications.

3. Segmented Ground Source Heat Exchanger—The GHEX is often oversized for cooling loads when designed for heating-dominated buildings or climates. With an integrated solar thermal system, this excess GHEX capacity can reduce costs and improve the GHP COP. The solar factor of thermal hot water systems is limited by storage capacity, which is often sized based on the thermal capacity of the array. Solar thermal collectors are one-half the costs of the required storage tanks sized to the array capacity. Therefore, the installed cost per Btu of capacity for a solar thermal array is substantially reduced if the solar array is expanded without increasing thermal tank storage capacity. A split or segmented GHEX makes this possible for heating dominated annual building loads. Consider the example for a GHP sized for ten GHEX loops or wells during winter heating operation. During summer operation, the GHEX meets the smaller cooling load using only six loops or wells, with the remaining four loops or wells available for thermal storage. The solar thermal array can be increased by the capacity provided by these four loops or wells. These loops or wells are "superheated" when compared to the stable ground temperature. When the GHP enters heating mode, COP increases as a result of the higher entering water temperature from the GHEX using all ten loops or wells. For a period of time during the transition from cooling to heating season, the hydronic radiant floor applications may directly use GHEX water in the heated loops or wells. HBSC will compare the radiant demand set point temperature to the GHEX loops or well temperature and solar thermal supply temperature to select a direct energy source, or the need to operate the GHP compressor to meet demand, which is higher (in heating) or lower (in cooling) to meet the space conditioning requirements.

With system-wide sensing and digital control of an advanced GHP, HBSC will operate the GHP to provide the highest system COP/EER. HBSC controller is operable to command the following actions:

1. Direct use of the solar thermal fluid (bypassing the GHEX);
2. Direct use of GHEX fluid;
3. Engage the GHP to heat/cool the load side fluid to set point based on an outdoor reset; or
4. Perform a combination of these functions.

The proposed integrated HBSC represents a significant advance over existing controls which are plagued by incomplete functionality, high cost, complex and proprietary installation requirements, and a failure to recognize advanced capabilities of GHPs. HBSC delivers an affordable and interoperable control based on existing commercial standards, and reduces installation cost, complexity, and serviceability of the control system.

Related Research or R&D—Thermodynamics is not a new science. A patent of particular relevance to radiant floor cooling was issued in 1993 to Galiyano (U.S. Pat. No. 5,261,251) which disclosed a hydronic cooling and heating system through a slab with an in-ground heat exchanger and compressor. U.S. Pat. No. 7,234,314 discloses methods for geothermal heating and cooling with solar heating. Dehumidification using an ERV is disclosed in U.S. Pat. No. 7,845,185. Dr. Roy Crawford has a patent pending for humidity control for air conditioning systems (U.S. Patent Publication No. 2007/0261422 A1). Control algorithms have been researched since the mid-20$^{th}$ century. Today, this basic science is used in residential, commercial, and industrial buildings worldwide. Work in Sweden by Karlsson and Fahlén are just a few of many that have shown ground source heat pumps can be optimized in hydronic heating and cooling applications. The literature is replete with current research in this area.

Likewise, software programmable microprocessors with open standards interoperability such as BACnet have been developed for decades. While different in application, the science of enterprise control of heating and cooling systems is not new or particularly complex. The unique combination of these elements into a single low-cost control system is innovative and unique. There are undoubtedly hundreds of patents for controls involving radiant hydronic heating and cooling systems, variable speed devices, solar thermal storage, and latent heat extraction.

With more advanced control algorithms, system efficiencies utilizing W-W GHPs can be increased substantially. By focusing mainly on incremental enhancements to existing systems, controls manufacturers have avoided innovative HVAC products and designs which promise to deliver the highest return on investment when balancing first costs with energy savings. Examples include the control of two-stage and variable speed water-water GHPs and multi-speed and variable speed flow center pumps. There has been no demand for an optimized control for integrated hydronic systems with water-water GHPs, since no U.S. GHP manufacturer offers VS technology in W-W heat pumps. In Europe, VS W-W heat pumps are equipped with internal controls for heating only applications. Controls manufacturers have not addressed the need for enterprise control as geothermal heat pumps represent less than ½% of the HVAC control market of which W-W units in hydronic applications constitute a miniscule market segment.

European hydronic system configurations and modeling methods are the most compelling, and specifically research funded by the Swedish Energy Agency (SEA) involving W-W GHPs equipped with VS compressors, electronic expansion valves, and variable frequency drive circulators in hydronic heating applications.

The European Heat Pump Association has reported that more than 127,000 heat pumps were installed in Sweden in 2011 making Sweden the largest market in Europe. While hydronic heating with radiators is the prevalent distribution system, new homes utilize in-floor heating. According to the SEA, the heat pumps installed will supply 22.5 Terawatt Hours (TWh) of capacity. Of this, 15 TWh is free energy from the ground representing 10% of all energy supplied to Swedish buildings. Research which is relevant to this innovation was funded by the SEA and carried out at SP Technical Research Institute of Sweden and Chalmers University of Technology, in collaboration with Wilo, Grundfos, Carrier, Uponor, and others. The scope of work was "to investigate the potential for increased system energy efficiency of heat pumps by applying variable-speed capacity control to compressors, pumps and fans, as well as an overall strategy for on-line optimization of the operation," with the core focus on GHPs connected to hydronic heating. The SEA study results are consistent with proposed HBSC functions implementing GHP-centric hydronic systems in the United States, including:

1. System design and control can positively impact system energy efficiency more than individual component improvements (GHP, pumps, compressors, and fans). When evaluating VS and intermittent GHP operation, it is important to consider the transient behavior of the heating system (not just steady state conditions);
2. The use of efficient circulators is of primary importance for GHPs equipped with VS compressors;
3. Source circulator capacity control can be implemented using simple algorithms approaching optimal control. These algorithms can be external to the circulator, as many internal (on-line) state-of-the-art controls need improvement for optimal efficiency;
4. The $SPF_{HS}$ is the appropriate metric for the energy efficient design of an integrated GHP hydronic heating system;
5. With optimal control, $SPF_{HS}$ can be improved 30% over conventional methods; and
6. Heat pump EER and COP are poor predictors of overall system heating and cooling system performance.

Figure 8:
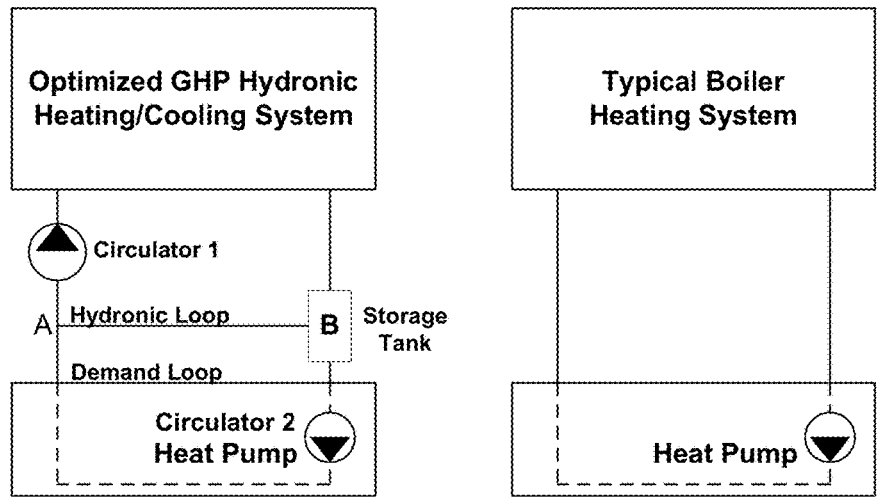
FIG. 8 shows a GHP parallel piping design versus a serial boiler connection to a hydronic system.

Ground source heat pump source side flow requirements are the key external determinant affecting GHP efficiency. Serial hydronic systems designs for conventional boiler systems are not appropriate for GHP applications, since source side flow rate is not optimized for distribution loop flow. This concept is shown in FIG. 8. The connection of the GHP to the hydronic system assumes a primary/secondary piping configuration as shown on the left in FIG. 8. The design incorporates a parallel connection which differs from a typical boiler heating system piped in series to the distribution circuit shown on the right in FIG. 8.

This method decouples the heat pump demand circuit from the hydronic distribution, so that loop flows are optimal for the respective application. The most energy efficient flow rate for the hydronic loop occurs at the lowest flow rate that will meet building demand. Lower flow rates during heating are possible when the system is designed for the increased PEX tubing density required for RFC operation. The slightly higher materials cost are offset by the benefits incurred: lower operating costs, reduced noise and erosion, and lower head pressure. The hydronic loop (Circulator 1 in FIG. 8) flow rate should be higher than the demand loop (Circulator 2) to ensure mixing occurs on the supply side A, instead of the return side B. This configuration ensures GHP efficiency based on optimum entering water temperature.

The ideal flow in the demand loop is dependent on the GHP configuration and capacity, related to the building load. Contrary to conventional wisdom, the optimal design may not optimize the COP; rather, it should be based on the $SPF_{HS}$. COP is the performance ratio of heat supplied to the demand loop compared to the work consumed in a steady state by an electric compression heat pump at a given set of temperature conditions. SPF is the ratio of the heat energy delivered (Btu's) and the total energy supplied (watt/hr) over a season. While the system heating metric $SPF_{HS}$ is illustrative, cooling system performance would utilize a similar metric such as $SPF_{CS}$. SPF differs from COP in that boundary parameters can be established for the Heat Pump ($SPF_{HP}$), Heat Pump System including pumps or fans ($SPF_{HPS}$), or the Heating System ($SPF_{HS}$), GHP, pumps, fans, and supplement heating. SPF accounts for intermittent or partial load GHP operation, varying operating temperatures, and energy expended for ancillary equipment operation. COP can be misleading on predicting actual energy savings. For instance, a VS GHP delivers better performance at partial load conditions with an 11% increase in COP. A GHP equipped with a single stage compressor has a 14-19% higher $SPF_{HS}$ after considering the energy losses of the Variable Frequency Drive (VFD) and circulation pumps operating at full speed under partial load conditions. HBSC establishes a demand loop flow rate to optimize $SPF_{HS}$, yet as a secondary function to the source side circulator.

Figure 9:
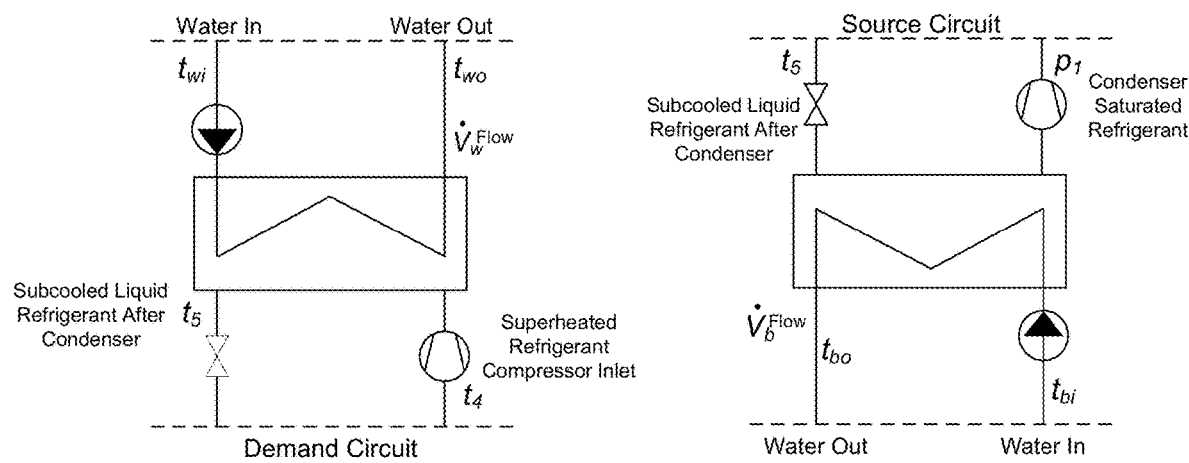
FIG. 9 shows the boundaries for optimizing the demand and source systems for a typical GHP.

The dominant control parameter to establish optimal $SPF_{HS}$ or $SPF_{CS}$ for fixed and VS GHPs is source circulator flow rate. This control parameter outweighs the effect of any other parameter depicted in FIG. 9 outlining the system boundary conditions for a typical GHP. The demand circuit input data are load return water temperature ($t_{wi}$), the evaporator temperature, evaporator superheat, required demand capacity, and the temperature differential between $t_s$ and $t_{wi}$ across the heat exchanger. The source circuit input data include the source entering water temperature (EWT, or $t_{bi}$—brine in), the temperature of the refrigerant leaving the condenser, the condensing pressure, and the evaporator superheat. Controlling the source side flow set point (ground loop flow center) is the key determinant to GHP efficiency. Varying demand side circulator flow from 60% to 100% capacity affects actual COP by only 1% as compared to the optimal COP. In contrast, setting the source circulator speed as a linear function of the compressor speed can improve the $SPF_{HS}$ as much as 20% for single or two-stage W-W GHPs, or VS GHPs without on-board flow center circulator control.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and circuitry and widely differing embodiments and applications will suggest themselves without departing from the scope of the disclosed subject matter.

What is claimed is:

1. A system for conditioning a space comprising:
   a conditioned space;
   at least one thermally conductive structure thermally connected with the conditioned space;
      wherein a first piping through which a mixed radiant supply fluid and at least one hot water supply circulate is embedded in the at least one thermally conductive structure;
   at least one source process heat exchanger fluidly connected to at least one of:
   at least one cold water supply;
   and the at least one hot water supply;
      wherein the at least one source process heat exchanger is configured to do at least one of:
      cool the at least one cold water supply; and
      heat the at least one hot water supply;
   at least one first hydronic load circulator fluidly connected to:
   the at least one cold water supply;
   at least one radiant mixing device; and
   the at least one thermally conductive structure;
      wherein the at least one first hydronic load circulator is configured to:
      circulate the at least one cold water supply though the at least one radiant mixing device; and
      circulate the mixed radiant supply fluid comprising a portion of the at least one cold water supply from the at least one radiant mixing device through the at least one thermally conductive structure;
      wherein a temperature of the mixed radiant supply fluid is modulated by the operation of the at least one radiant mixing device that modulates a mixed flow of fluid comprised of at least one of:
      a portion of the mixed radiant supply fluid;
      a portion of a mixed radiant return fluid; and
      a portion of the at least one hot water supply maintained at
      a temperature greater than the temperature of the mixed radiant supply fluid;
   at least one second hydronic load circulator fluidly connected to:
   the at least one hot water supply; and
   the at least one thermally conductive structure;
      wherein the at least one second hydronic load circulator is configured to circulate the at least one hot water supply through the at least one thermally conductive structure;
   at least one hydronic-to-air circulator fluidly connected to at least one of:
   the at least one cold water supply;
   the at least one hot water supply; and
   at least one energy transfer and ventilation device comprising a dedicated outdoor air system (DOAS) configured with at least one first hydronic coil-to-air heat exchanger;
      wherein the at least one hydronic-to-air circulator is configured to circulate through the at least one first hydronic coil-to-air heat exchanger:
      a first coil supply fluid comprising the portion of the at least one cold water supply maintained at a temperature below at least one of:
      at least one fresh air dew point temperature of a fresh air supply;
      at least one conditioned air dew point temperature of an air moving into the conditioned space from the DOAS;

at least one conditioned space dew point temperature using a temperature sensed by at least one first temperature sensor and using a humidity sensed by at least one first humidity sensor; and
a second coil supply fluid comprising a portion of the at least one hot water supply;
wherein the DOAS is configured with at least one fresh air fan fluidly connected to the fresh air supply;
wherein the DOAS:
receives the fresh air supply, and
outputs into the conditioned space at least one of:
a fresh air; and
a conditioned air;
at least one of:
at least one second hydronic coil-to-air heat exchanger fluidly connected with the air in the conditioned space and fluidly connected with the at least one cold water supply fluidly connected to the at least one first hydronic load circulator,
wherein the at least one first hydronic load circulator is configured to circulate the mixed radiant supply fluid through the at least one second hydronic coil-to-air heat exchanger in fluid communication with the air in the conditioned space, and
wherein the air from the conditioned space circulates through the at least one second hydronic coil-to-air heat exchanger to cool the air in the conditioned space;
at least one water-to-air heat pump in fluid communication with the air in the conditioned space, wherein the at least one water-to-air heat pump supplies the conditioned air to the conditioned space and returns the air from the conditioned space;
the at least one first temperature sensor configured to sense a temperature in the conditioned space and output the sensed temperature to at least one microprocessor controller;
at least one second temperature sensor configured to sense a temperature in the at least one thermally conductive structure and output the sensed temperature to the at least one microprocessor controller;
at least one third temperature sensor configured to sense a temperature in the DOAS and output the sensed temperature to the at least one microprocessor controller;
at least one fourth temperature sensor configured to sense a temperature in the fresh air supply and output the sensed temperature to the at least one microprocessor controller;
the at least one first humidity sensor configured to sense a humidity in the conditioned space and output the sensed humidity in the conditioned space to the at least one microprocessor controller;
at least one second humidity sensor configured to sense a humidity in the DOAS and output the sensed humidity in the DOAS to the at least one microprocessor controller;
at least one third humidity sensor configured to sense a humidity in the fresh air supply and output the sensed humidity in the fresh air supply to the at least one microprocessor controller;

a plurality of sensors that send a plurality of sensor outputs to the at least one microprocessor controller, the plurality of sensors selected from the group consisting of at least four of:
at least two of:
the at least one first temperature sensor;
the at least one second temperature sensor;
the at least one third temperature sensor; and
the at least one fourth temperature sensor;
at least one of:
the at least one first humidity sensor;
the at least one second humidity sensor;
the at least one third humidity sensor;
an atmospheric pressure sensor;
a differential temperature sensor;
an air velocity sensor;
a fluid velocity sensor;
a watt/hour meter; and
a real time energy use sensor;
a building automation system comprising a client/server architecture and the at least one microprocessor controller;
at least one memory coupled to and readable by the at least one microprocessor controller and storing therein a plurality of instructions that, when executed by the at least one microprocessor controller, causes the at least one microprocessor controller to:
receive at least one of:
a cooling set point temperature for the conditioned space; and
a heating set point temperature for the conditioned space;
receive at least two of:
a temperature from at least one of:
the at least one first temperature sensor;
the at least one second temperature sensor;
the at least one third temperature sensor; and
the at least one fourth temperature sensor;
a humidity level from at least one of:
the at least one first humidity sensor;
the at least one second humidity sensor; and
the at least one third humidity sensor;
calculate at least one of:
the at least one fresh air dew point temperature of the fresh air supply;
the at least one conditioned air dew point temperature of the air moving into the conditioned space from the DOAS;
the at least one conditioned space dew point temperature using the temperature sensed by the at least one first temperature sensor and using the humidity sensed by the at least one first humidity sensor; and
at least one thermally conductive structure dew point temperature using the temperature sensed by the at least one second temperature sensor and the humidity sensed by the at least one first humidity sensor;
receive at least one of:
a temperature of the at least one cold water supply and a set point temperature of the at least one cold water supply; and
a temperature of the at least one hot water supply and a set point temperature of the at least one hot water supply;
execute at least four of:
send at least one of:

a cold water supply temperature control signal to the at least one source process heat exchanger to maintain the set point temperature of the at least one cold water supply; and a hot water supply temperature control signal to the at least one source process heat exchanger to maintain the set point temperature of the at least one hot water supply;

send a first hydronic load circulator control signal to the at least one first hydronic load circulator causing the at least one first hydronic load circulator to circulate the mixed radiant supply fluid; and send a second hydronic load circulator control signal to the at least one second hydronic load circulator causing the at least one second hydronic load circulator to circulate the at least one hot water supply;

send a mixed radiant supply control signal to at least one of:
the at least one radiant mixing device, and
the at least one first hydronic load circulator;
that modulates at least one of:
the temperature of the mixed radiant supply fluid; and
a flow rate of the mixed radiant supply fluid to maintain a temperature of the at least one thermally conductive structure above at least one of:
the at least one conditioned air dew point temperature;
the at least one conditioned space dew point temperature; and
the at least one thermally conductive structure dew point temperature;

send a DOAS temperature control signal to the DOAS that modulates a temperature of the conditioned air from the DOAS into the conditioned space;

send a hydronic-to-air circulator dehumidification control signal to the at least one hydronic-to-air circulator causing the at least one hydronic-to-air circulator to circulate the first coil supply fluid below a temperature of at least one of:
the at least one conditioned air dew point temperature; and
the at least one fresh air dew point temperature;

send a hydronic-to-air circulator heating control signal to the at least one hydronic-to-air circulator causing the at least one hydronic-to-air circulator to circulate the second coil supply fluid;

send a DOAS humidity control signal to the DOAS that modulates a humidity of the conditioned air from the DOAS into the conditioned space; and send a DOAS ventilation control signal to the DOAS to modulate a flow of the fresh air into the conditioned space.

2. The system according to claim 1 wherein the at least one thermally conductive structure is of a high mass and comprising the first piping embedded in at least one of:
at least one concrete structure; and
at least one gypsum concrete structure;
through which a thermal transfer fluid circulates through the first piping.

3. The system according to claim 1 wherein at least one of:
the at least one cold water supply and the at least one hot water supply comprise a portion of a heat transfer fluid circulating through a tank.

4. The system according to claim 1 wherein at least one of:
the at least one cold water supply and the at least one hot water supply comprise a portion of a heat transfer fluid circulating through the first piping and a second piping.

5. The system according to claim 1 wherein:
the at least one cold water supply comprises a first thermal storage for receiving thermal energy and the at least one hot water supply comprises a second thermal storage for transferring thermal energy.

6. The system according to claim 5 wherein at least one of:
the at least one cold water supply and the at least one hot water supply circulates through the first piping and a second piping.

7. The system according to claim 5 wherein at least one of:
the at least one cold water supply and the at least one hot water supply circulates through a tank.

8. The system according to claim 1 wherein the conditioned space is subject to a radiant heat gain from a direct solar exposure.

9. The system according to claim 1 wherein the fresh air supply is at least one of:
the fresh air from a fresh air intake; and
an outside air.

10. The system according to claim 1 wherein the at least one thermally conductive structure is oriented below and thermally connected with the conditioned space.

11. The system according to claim 1 wherein the at least one source process heat exchanger is fluidly connected to at least one of:
the at least one source process heat exchanger using a heat transfer fluid which circulates through a heat exchanger thermally connected to the at least one source process heat exchanger; and
the at least one source process heat exchanger using a heat transfer fluid which circulates within the at least one source process heat exchanger.

12. The system according to claim 1 wherein the at least one source process heat exchanger is comprised of:
at least one heat exchanger thermally connected to a thermal energy storage;
at least one heat exchanger thermally connected to a ground water; and
at least one heat exchanger configured for waste heat recovery.

13. The system according to claim 12 wherein the at least one source process heat exchanger is comprised of:
at least one air-to-water heat pump;
at least one water-to-water heat pump;
at least one boiler; and
at least one chiller configured without a cooling tower.

14. The system according to claim 1 wherein the at least one source process heat exchanger is at least one cooling supply selected from the group consisting of:
a ground water;
a surface water; and
a waste cooling.

15. The system according to claim 1 wherein the at least one source process heat exchanger is comprised of:
an electric boiler;
a solar thermal array; and
a waste heating.

16. The system according to claim 1 wherein the at least one source process heat exchanger is at least one water-to-water heat pump configured as a reversing chiller.

17. The system according to claim 1 wherein the temperature of the mixed radiant supply fluid is modulated by the operation of the at least one radiant mixing device wherein the at least one radiant mixing device is at least one of:
 a modulating valve; and
 the at least one first hydronic load circulator is of variable speed.

18. The system according to claim 1 wherein the temperature of the at least one thermally conductive structure is modulated by a first flow rate of the mixed radiant supply fluid through the at least one thermally conductive structure, wherein the first flow rate of the mixed radiant supply fluid is modulated by at least one of:
 a modulating valve;
 the at least one first hydronic load circulator is of variable speed; and
 the operation of the at least one radiant mixing device.

19. The system according to claim 1 wherein the DOAS does not utilize an evaporative condenser.

20. The system according to claim 1 wherein the at least one source process head exchanger does not comprise a cooling tower.

21. The system according to claim 1 wherein at least one of:
 the at least one hydronic-to-air circulator is configured to circulate through the at least one first hydronic coil-to-air heat exchanger the first coil supply fluid comprising the portion of the at least one cold water supply maintained at a temperature above at least one of:
  the at least one conditioned air dew point temperature; and
  the at least one fresh air dew point temperature; and
 the at least one microprocessor controller is configured to send a hydronic-to-air circulator cooling control signal to the at least one hydronic-to-air circulator causing the at least one hydronic-to-air circulator to circulate the first coil supply fluid below a temperature of at least one of:
  the at least one conditioned air dew point temperature; and
  the at least one fresh air dew point temperature; and
 the at least one hydronic-to-air circulator is configured to circulate through the at least one first hydronic coil-to-air heat exchanger the second coil supply fluid comprised of at least one of:
  a portion of the first coil supply fluid and a portion of the second coil supply fluid;
  the portion of the at least one hot water supply maintained at a temperature greater than the first coil supply fluid; and
  a portion of a second coil return fluid; and
 the at least one microprocessor controller is configured to send a hydronic-to-air circulator variable control signal to the at least one hydronic-to-air circulator causing the at least one hydronic-to-air circulator to circulate a portion of the second coil supply fluid.

22. The system according to claim 1 further comprising the steps of substituting the at least one water-to-air heat pump in fluid communication with the air in the conditioned space with an air-conditioner.

23. The system according to claim 1 further comprising the at least one water-to-air heat pump is fluidly connected to a supply fluid comprised of a portion of at least one of:
 the at least one cold water supply;
 the at least one hot water supply;
 a ground heat exchanger fluid; and
 a source process heat exchanger fluid.

24. The system according to claim 1 wherein the at least one water-to-air heat pump further comprises:
 a two-stage compressor;
 a variable speed electronically commutated motor fan; and
 a dedicated microprocessor controller which is BACnet-compatible;
  wherein the at least one water-to-air heat pump outputs a supplemental conditioned air into the conditioned space.

25. The system according to claim 1 wherein the plurality of instructions comprises at least one process heat pump staging algorithm that, when executed by the at least one microprocessor controller, and in response to receiving and processing at least two of:
 a cooling set point for a chilled water;
 a heating set point for a heated water;
 a temperature for the chilled water; and
 a temperature for the heated water;
causes the at least one microprocessor controller to send at least one process heat pump staging control signal to at least one process water-to-water heat pump to modulate at least one of:
 a compressor stage; and
 at least two compressors.

26. The system according to claim 1 further comprising:
 the at least one water-to-air heat pump is fluidly connected to at least one of:
  at least one supply entering water mixing valve; and
  at least one supply entering water flow control valve;
 the plurality of instructions comprises at least one entering water control valve algorithm that, when executed by the at least one microprocessor controller, and in response to receiving and processing at least two of:
  the cooling set point temperature for the conditioned space;
  the heating set point temperature for the conditioned space; and
  a temperature for the conditioned space;
 causes the at least one microprocessor controller to send at least one entering water temperature flow control signal to at least one of:
  the at least one supply entering water mixing valve; and
  the at least one supply entering water flow control valve;
 to modulate at least one of:
  a supply entering water temperature; and
  a supply entering water flow rate.

27. The system according to claim 1 wherein the building automation system further comprises:
 a configuration to stage priority of at least one of:
  a cooling; and
  a ventilation;
 by at least one of:
  the at least one fresh air fan;
  the DOAS;
  the at least one thermally conductive structure; and
  the at least one water-to-air heat pump;
 wherein at least one of:
  the at least one fresh air fan fluidly connected to the fresh air supply is staged with the DOAS to provide the ventilation;

the at least one fresh air fan fluidly connected to the fresh air supply provides at least one of the ventilation and the cooling before at least one of:
the DOAS provides at least one of the ventilation and the cooling;
the at least one water-to-air heat pump provides at least one of the ventilation and the cooling; and
the at least one thermally conductive structure provides the cooling;
the DOAS provides the cooling before at least one of:
the at least one thermally conductive structure provides the cooling; and
the at least one water-to-air heat pump provides the cooling;
the at least one thermally conductive structure provides the cooling before the at least one water-to-air heat pump provides the cooling; and
the at least one water-to-air heat pump is configured with at least two compressor stages and operated at a lower compressor stage to provide the cooling for a time period before operating at a higher compressor stage to provide the cooling.

28. The system according to claim 1 wherein the building automation system further comprises at least one of:
a BACnet building automation protocol;
a Modbus building automation protocol; and
a LonWorks building automation protocol.

29. The system according to claim 1 wherein the building automation system further comprises:
a programmable user interface for viewing on at least one workstation;
a programmable devices controller that receives a plurality of digital signals from the at least one microprocessor controller, wherein the programmable devices controller sends a plurality of control signals; and
a plurality of devices receives the plurality of control signals; and
at least one of:
a wireless interface for communicating with at least one mobile device;
a communications module; and
a web server.

30. The system according to claim 1 further comprising at least one of:
the plurality of instructions that, when executed by the at least one microprocessor controller is executed by least one of:
the at least one microprocessor controller;
a dedicated controller on a device; and
the at least one microprocessor controller in communication with the dedicated controller on the device; and
at least one control signal that, when executed by the at least one microprocessor controller is sent by at least one of:
the at least one microprocessor controller;
the dedicated controller on the device; and
the at least one microprocessor controller in communication with the dedicated controller on the device.

31. The system according to claim 30 wherein the plurality of instructions, when executed by the at least one microprocessor controller, priorities at least one of:
a heating by the at least thermally conductive structure before other means of heating the conditioned space; and a cooling by the at least one thermally conductive structure before other means of cooling the conditioned space.

32. The system according to claim 1 wherein the plurality of instructions comprises a plurality of set points that are controlled by the building automation system and can be adjusted.

33. The system according to claim 1 wherein the plurality of instructions comprises at least one energy efficiency algorithm that, when executed by the at least one microprocessor controller, and in response to receiving and processing at least one energy produced data divided by at least one energy used data over a time period, causes the at least one microprocessor controller to calculate in real time the highest energy efficiency for at least one of:
the system; and
a component within the system.

34. The system according to claim 1 wherein the building automation system is configured to process at least one of:
a solar heat gain data; and
an infrared heat gain data from lighting;
the plurality of instructions comprises at least one infrared heat gain algorithm that, when executed by the at least one microprocessor controller, and in response to receiving and processing at least one of:
the solar heat gain data; and
the infrared heat gain data from lighting;
causes the at least one microprocessor controller to modify at least one of:
the staging of a cooling;
the staging of a heating;
the cooling set point temperature for the conditioned space;
a future cooling set point temperature for the conditioned space;
the heating set point temperature for the conditioned space; and
a future heating set point temperature for the conditioned space;
wherein at least one of:
a staging;
the cooling set point temperature; and
the heating set point temperature;
can be adjusted for at least one of:
to predict set points for an optimal comfort; and
stage processes for an optimal system energy efficiency;
wherein the optimal comfort is achieved by maintaining a set point temperature closer to a desired set point temperature for the conditioned space than maintaining the set point to the desired set point temperature without using the control functions of the infrared heat gain algorithm; and
the optimal energy efficiency is attained by a second energy efficiency of the system which is greater than a first energy efficiency of the system calculated without using the control functions of the infrared heat gain algorithm;
wherein the first energy efficiency and the second energy efficiency is calculated as the highest system energy efficiency as measured by energy produced divided by energy used over a time period.

35. The system according to claim 1 wherein the plurality of instructions comprises at least one thermal mass predictive control algorithm that, when executed by the at least one microprocessor controller, and in response to receiving and processing at least one performance data of the rate of change in a temperature over time for at least one of:
  the at least one thermally conductive structure; and
  the conditioned space;
causes the at least one microprocessor controller to determine the optimal delay time before sending at least one control signal enabling at least one of:
  a cooling in response to a real time cooling demand;
  a cooling in response to a scheduled cooling demand;
  a heating in response to a real time heating demand;
  a heating in response to a scheduled heating demand;
  a shutdown of a cooling; and
  a shutdown of a heating;
    wherein the optimal delay time is at least one of:
      a lead time for the conditioned space temperature to equal a desired occupied comfort set point of the conditioned space after at least one of:
        a cooling control signal; and
        a heating control signal;
      a lag time for the conditioned space temperature to maintain a desired occupied comfort set point of the conditioned space after at least one of:
        the shutdown control signal of a cooling; and
        the shutdown control signal of a heating.

36. The system according to claim 1 wherein the building automation system is configured to process at least one of:
  a historic data;
  a climate data; and
  a real time weather data;
received from at least one of:
  a website through a communications module;
  a historical data;
  an outdoor sensor; and
  a sensor which measures at least one outdoor weather condition;
    wherein the historic data is data recorded over a time period; and
    the climate data is a weather data prevailing in at least one of:
      an area in general; and
      over a time period;
        wherein the weather data is at least one of:
          a temperature;
          a humidity;
          an atmospheric pressure;
          a wind;
          a precipitation;
          a cloudiness; and
          a radiation; and
        a real time weather data is the weather data occurring when the data is sensed.

37. The system according to claim 1 wherein the plurality of instructions comprises at least one outdoor air staged cooling control algorithm that, when executed by the at least one microprocessor controller, and in response to receiving and processing at least three of:
  a cooling demand;
  a required cooling response time period to meet the cooling demand;
  a temperature sensed by the at least one first temperature sensor;
  a temperature sensed by the at least one fourth temperature sensor;
  an offset temperature;
  the historical data;
  the climate data; and
  the real time weather data;
determines that a cooling demand is present and at least one of:
  the fresh air supply temperature is lower than the temperature in the conditioned space; and
  the fresh air supply temperature is lower than a temperature in the conditioned space by the offset temperature; and
causes the at least one microprocessor controller to execute at least one of:
  prioritize a cooling with the at least one thermally conductive structure before a cooling with the fresh air supply; and
  prioritize a cooling with the fresh air supply before a cooling with the at least one thermally conductive structure; and
  send at least one ventilation air fan control signal to at least one of:
    the DOAS; and
    the at least one fresh air fan to modulate a fan speed;
    until at least one of:
      the cooling demand is met; and
      the cooling demand is met within the required cooling response time period; and
  when the cooling demand is not met with the fresh air supply, or the cooling demand is not met within the required response time period, the at least one microprocessor controller sends the at least one first hydronic load circulator a cooling control signal to initiate the cooling with the at least one thermally conductive structure.

38. The system according to claim 36 wherein:
the plurality of instructions comprises at least one outdoor reset cooling control algorithm that, when executed by the at least one microprocessor controller, and in response to receiving and processing at least two of:
  an operative dew point temperature selected from the group consisting of:
    the at least one fresh air dew point temperature;
    the at least one conditioned air dew point temperature; and
    the at least one conditioned space dew point temperature; and
  the at least one first temperature sensor;
  the at least one third temperature sensor;
  the at least one fourth temperature sensor;
  the at least one first humidity sensor;
  the historic data;
  the climate data; and
  the real time weather data;
causes the at least one microprocessor controller to send the cold water supply temperature control signal to modify the set point temperature of the at least one cold water supply to maintain the temperature of the at least one cold water supply below the operative dew point temperature.

39. The system according to claim 36 wherein the plurality of instructions comprises at least one pre-cooling control algorithm that, when executed by the at least one microprocessor controller, and in response to receiving and processing at least three of:
  a cooling demand;
  a required cooling response time period to meet the cooling demand;
  a temperature sensed by the at least one first temperature sensor;
  the historic data;
  the climate data; and the real time weather data;
causes the at least one microprocessor controller to:
  anticipate a cooling requirement for the conditioned space; and
  send the first hydronic load circulator control signal to the at least one first hydronic load circulator causing the at least one first hydronic load circulator to circulate the mixed radiant supply fluid to initiate a cooling of the at least one thermally conductive structure prior to a required cooling response time period to meet the cooling requirement for the conditioned space.

40. A system for conditioning a space, comprising:
a conditioned space;
at least one thermally conductive structure thermally connected with the conditioned space;
at least one source process heat exchanger fluidly connected to at least one cold water supply and
at least one hot water supply;
at least one first process heat circulator fluidly connected to the at least one source process heat exchanger and configured to circulate a first supply fluid to the at least one cold water supply;
at least one second process heat circulator fluidly connected to the at least one source process heat exchanger and configured to circulate a second supply fluid to the at least one hot water supply;
at least one hydronic-to-air circulator fluidly connected to the at least one cold water supply and the at least one hot water supply;
at least one energy transfer and ventilation device comprising a dedicated outdoor air system (DOAS) configured with at least one first hydronic coil-to-air heat exchanger;
  wherein the at least one hydronic-to-air circulator is configured to circulate through the at least one first hydronic coil-to-air heat exchanger:
    a first coil supply fluid comprising a portion of the at least one cold water supply maintained at a temperature below at least one of
      at least one fresh air dew point temperature of a fresh air supply;
      at least one conditioned air dew point temperature of an air moving into the conditioned space from the DOAS;
      at least one conditioned space dew point temperature using a temperature sensed by at least one first temperature sensor and using a humidity sensed by at least one first humidity sensor; and
    wherein the DOAS is configured with at least one fresh air fan fluidly connected to the fresh air supply;
    wherein the DOAS:
      receives the fresh air supply, and
      outputs into the conditioned space at least one of:
        a fresh air; and
        a conditioned air;
at least one fan coil unit comprising:
  a fan; and
  at least one fan coil unit hydronic-coil-to-air heat exchanger in fluid communication with the air in the conditioned space;
  wherein the at least one fan coil unit supplies the conditioned air into the conditioned space and returns the air to the at least one fan coil unit from the conditioned space and exhausts the air from the conditioned space;
a radiant mixing device in fluid communication with the at least one cold water supply, the thermally conductive structure, and the at least one fan coil unit hydronic-coil-to-air heat exchanger;
at least one first hydronic load circulator fluidly connected to the at least one cold water supply and fluidly connected to the at least one radiant mixing device;
  wherein the at least one first hydronic load circulator circulates a first hydronic supply fluid comprising the portion of the at least one cold water supply and through the at least one radiant mixing device;
the at least one first hydronic load circulator is fluidly connected to the at least one thermally conductive structure and to the at least one fan coil unit hydronic-coil-to-air heat exchanger;
the at least one first hydronic load circulator circulates a mixed radiant supply fluid comprised of a portion of at least one of:
  the first hydronic supply fluid; and
  a first hydronic return fluid;
from the at least one radiant mixing device through:
  the thermally conductive structure; and
  the at least one fan coil unit hydronic-coil-to-air heat exchanger;
    wherein a temperature of the mixed radiant supply fluid is modulated by the operation of at least one of:
      the at least one radiant mixing device; and
      the at least one first hydronic load circulator;
at least one second hydronic load circulator fluidly connected to the at least one hot water supply and fluidly connected to the at least one thermally conductive structure and fluidly connected to the at least one fan coil unit hydronic-coil-to-air heat exchanger and fluidly connected to at least one DOAS hydronic-coil-to-air heat exchanger;
  wherein the at least one second hydronic load circulator is configured to circulate a second hydronic supply fluid comprised of a portion of the at least one hot water supply;
  to at least one of:
    the thermally conductive structure;
    the at least one fan coil unit hydronic-coil-to-air heat exchanger; and
    the at least one DOAS hydronic-coil-to-air heat exchanger;
the at least one first temperature sensor configured to sense a temperature in the conditioned space and output the sensed temperature to at least one microprocessor controller;
at least one second temperature sensor configured to sense a temperature in the at least one thermally conductive structure and output the sensed temperature to the at least one microprocessor controller;
at least one third temperature sensor configured to sense a temperature in the DOAS and output the sensed temperature to the at least one microprocessor controller;
at least one fourth temperature sensor configured to sense a temperature in the fresh air supply and output the sensed temperature to the at least one microprocessor controller;
the at least one first humidity sensor configured to sense the humidity in the conditioned space and output the sensed humidity in the conditioned space to the at least one microprocessor controller;

at least one second humidity sensor configured to sense a humidity in the DOAS and output the sensed humidity in the DOAS to the at least one microprocessor controller;
at least one third humidity sensor configured to sense a humidity in the fresh air supply and output the sensed humidity in the fresh air supply to the at least one microprocessor controller;
a plurality of sensors that send a plurality of sensor outputs to the at least one microprocessor controller, the plurality of sensors selected from the group consisting of at least four of:
  at least two of:
    the at least one first temperature sensor;
    the at least one second temperature sensor;
    the at least one third temperature sensor; and
    the at least one fourth temperature sensor;
  at least one of:
    the at least one first humidity sensor;
    the at least one second humidity sensor;
    the at least one third humidity sensor;
    an atmospheric pressure sensor;
    a differential temperature sensor;
    an air velocity sensor;
    a fluid velocity sensor;
    a watt/hour meter; and
    a real time energy use sensor;
a building automation system comprising a client/server architecture and the at least one microprocessor controller;
at least one memory coupled to and readable by the at least one microprocessor controller and storing therein a plurality of instructions that, when executed by the at least one microprocessor controller, causes the at least one microprocessor controller to:
  receive at least one of:
    a cooling set point temperature for the conditioned space; and
    a heating set point temperature for the conditioned space;
  receive at least two of:
    a temperature from at least one of:
      the at least one first temperature sensor;
      the at least one second temperature sensor;
      the at least one third temperature sensor; and
      the at least one fourth temperature sensor;
    a humidity level from at least one of:
      the at least one first humidity sensor;
      the at least one second humidity sensor; and
      the at least one third humidity sensor;
  calculate at least one of:
    the at least one fresh air dew point temperature of the fresh air supply;
    the at least one conditioned air dew point temperature of the air moving into the conditioned space from the DOAS;
    the at least one conditioned space dew point temperature using the temperature sensed by the at least one first temperature sensor and using the humidity sensed by the at least one first humidity sensor; and
    at least one thermally conductive structure dew point temperature using the temperature sensed by the at least one second temperature sensor and the humidity sensed by the at least one first humidity sensor;
  receive at least one of:
    a temperature of the at least one cold water supply and a set point temperature of the at least one cold water supply; and
    a temperature of the at least one hot water supply and a set point temperature of the at least one hot water supply;
  execute at least four of:
    send at least one of:
      a cold water supply temperature control signal to the at least one source process heat exchanger to maintain the set point temperature of the at least one cold water supply; and
      a hot water supply temperature control signal to the at least one source process heat exchanger to maintain the set point temperature of the at least one hot water supply;
    send a first hydronic load circulator control signal to the at least one first hydronic load circulator causing the at least one first hydronic load circulator to circulate the mixed radiant supply fluid; and
    send a second hydronic load circulator control signal to the at least one second hydronic load circulator causing the at least one second hydronic load circulator to circulate the at least one hot water supply;
    send a mixed radiant supply control signal to at least one of:
      the at least one radiant mixing device, and
      the at least one first hydronic load circulator;
      that modulates at least one of:
        the temperature of the mixed radiant supply fluid; and
        a flow rate of the mixed radiant supply fluid to maintain a temperature of the at least one thermally conductive structure above at least one of:
          the at least one conditioned air dew point temperature;
          the at least one conditioned space dew point temperature; and
          the at least one thermally conductive structure dew point temperature;
    send a DOAS temperature control signal to the DOAS that modulates a temperature of the conditioned air from the DOAS into the conditioned space;
    send a hydronic-to-air circulator dehumidification control signal to the at least one hydronic-to-air circulator causing the at least one hydronic-to-air circulator to circulate the first coil supply fluid below a temperature of at least one of:
      the at least one conditioned air dew point temperature; and
      the at least one fresh air dew point temperature;
    send a hydronic-to-air circulator heating control signal to the at least one hydronic-to-air circulator causing the at least one hydronic-to-air circulator to circulate the second coil supply fluid;
    send a DOAS humidity control signal to the DOAS that modulates a humidity of the conditioned air from the DOAS into the conditioned space; and
    send a DOAS ventilation control signal to the DOAS to modulate a flow of the fresh air into the conditioned space.

41. The system according to claim 40 wherein the at least one thermally conductive structure is of a high mass and comprising a first piping embedded in at least one of:
- at least one concrete structure; and
- at least one gypsum concrete structure;
- through which a thermal transfer fluid circulates through the first piping.

42. The system according to claim 40 wherein at least one of:
- the at least one cold water supply and the at least one hot water supply comprise a portion of a heat transfer fluid circulating through a tank.

43. The system according to claim 42 wherein the heat transfer fluid contained in the tank and the heat transfer fluid contained in at least one of the first piping and the second piping is comprised of
- at least one portion of a water and at least one portion of a propylene glycol.

44. The system according to claim 40 wherein at least one of:
- the at least one cold water supply and the at least one hot water supply comprise a portion of a heat transfer fluid circulating through the first piping and a second piping.

45. The system according to claim 40 wherein:
- the at least one cold water supply comprises a first thermal storage for receiving thermal energy and the at least one hot water supply comprises a second thermal storage for transferring thermal energy.

46. The system according to claim 45 wherein at least one of:
- the at least one cold water supply and the at least one hot water supply circulates through the first piping and a second piping.

47. The system according to claim 45 wherein at least one of:
- the at least one cold water supply and the at least one hot water supply circulates through a tank.

48. The system according to claim 40 wherein a heat transfer fluid is fluidly connected is at least one of:
- thermally and fluidly connected using the heat transfer fluid which circulates without using at least one external heat exchanger through which the heat transfer fluid circulates; and
- fluidly connected using the heat transfer fluid which circulates through the at least one external heat exchanger.

49. The system according to claim 40 wherein the at least one thermally conductive structure is at least one of:
- oriented below and thermally connected with the conditioned space; and
- oriented above and thermally connected with the conditioned space.

50. The system according to claim 40 wherein the at least one source process heat exchanger comprises:
- at least one boiler;
- at least one chiller;
- at least one heat pump; and
- at least one process heat exchanger.

51. The system according to claim 50 wherein the at least one process heat exchanger is at least one of a cooling source and one of a heating source selected from the group consisting of:
- a thermal energy storage;
- a ground water;
- a surface water;
- a waste cooling; and
- a waste heating.

52. The system according to claim 40 wherein the at least one fan coil unit is substituted with at least one water-to-air heat pump.

53. The system according to claim 40 wherein the building automation system further comprises at least one of:
- a BACnet building automation protocol;
- a Modbus building automation protocol; and
- a LonWorks building automation protocol.

54. A system for conditioning a space, comprising:
- a conditioned space;
- at least one thermally conductive structure oriented below and thermally connected with the conditioned space wherein the at least one thermally conductive structure is of a high mass and comprising a piping embedded in a concrete;
- at least one source process heat exchanger fluidly connected to at least one first source heat exchanger and at least one second source heat exchanger;
- at least one first process heat circulator fluidly connected to the at least one source process heat exchanger and configured to circulate the at least one cold water supply to the at least one first source heat exchanger;
- at least one first hydronic load circulator fluidly connected to the at least one source process heat exchanger and configured to circulate the at least one cold water supply to the at least one first source heat exchanger;
- at least one second process heat circulator fluidly connected to the at least one source process heat exchanger and configured to circulate at least one hot water supply through the at least one second source heat exchanger;
- at least one second hydronic load circulator fluidly connected to the at least one source process heat exchanger and configured to circulate the at least one hot water supply to the at least one second source heat exchanger;
- at least one hydronic-to-air circulator fluidly connected to the at least one cold water supply and the at least one hot water supply, and configured to circulate at least one first hydronic coil supply fluid in thermal communication with the at least one cold water supply, and in thermal communication with the at least one hot water supply;
- at least one energy transfer and ventilation device comprising a dedicated outdoor air system (DOAS) configured with at least one first hydronic coil-to-air heat exchanger;
  - wherein the at least one hydronic-to-air circulator is configured to circulate through the at least one first hydronic coil-to-air heat exchanger:
    - a first coil supply fluid comprising a portion of the at least one cold water supply maintained at a temperature below at least one of
      - at least one fresh air dew point temperature of a fresh air supply;
      - at least one conditioned air dew point temperature of an air moving into the conditioned space from the DOAS;
      - at least one conditioned space dew point temperature using a temperature sensed by at least one first temperature sensor and using a humidity sensed by at least one first humidity sensor; and
    - wherein the DOAS is configured with at least one fresh air fan fluidly connected to the fresh air supply;
    - wherein the DOAS:
      - receives the fresh air supply, and
      - outputs into the conditioned space at least one of:

a fresh air; and
a conditioned air;
at least one first thermal load 3-way control valve in fluid connection with the at least one hydronic coil-to-air heat exchanger, the at least one hydronic coil supply fluid;
wherein the first thermal load 3-way control valve modulates a flow between the at least one hydronic supply fluid and the second hydronic supply fluid to the at least one hydronic coil-to-air heat exchanger;
at least one second hydronic coil-to-air heat exchanger fluidly connected with the air in the conditioned space and fluidly connected with the at least one cold water supply fluidly connected to the at least one first hydronic load circulator;
wherein the at least one first hydronic load circulator is configured to circulate the mixed radiant supply fluid through at least one second hydronic coil-to-air heat exchanger in fluid communication with the air in the conditioned space; and
wherein the air from the conditioned space circulates through the at least one second hydronic coil-to-air heat exchanger to cool the air in the conditioned space;
a first radiant mixing device in fluid communication with the at least one first source heat exchanger and at least one water-to-water heat pump;
wherein the first radiant mixing device modulates a flow between the at least one first source heat exchanger and the at least one water-to-water heat pump;
the at least one first hydronic load circulator fluidly connected to the first radiant mixing device wherein the at least one first hydronic load circulator circulates a first hydronic supply fluid to:
the at least one first source heat exchanger;
the at least one water-to-water heat pump; and
the first radiant mixing device;
wherein the temperature of the first hydronic supply fluid is modulated by at least one of:
the operation of the first radiant mixing device;
a flow through the at least one first source heat exchanger; and
at least one of:
a flow through the at least one water-to-water heat pump; and
an operation of the at least one water-to-water heat pump;
a second radiant mixing device in fluid communication with the at least one second source heat exchanger and the at least one water-to-water heat pump;
wherein the second radiant mixing device modulates a flow between the at least one second source heat exchanger and the at least one water-to-water heat pump;
the at least one second hydronic load circulator fluidly connected to the second radiant mixing device wherein the at least one second hydronic load circulator circulates a second hydronic supply fluid to:
the at least one second source heat exchanger;
the at least one water-to-water heat pump; and
the second radiant mixing device;
wherein a temperature of the second hydronic supply fluid is modulated by at least one of:
the operation of the second radiant mixing device;
the flow through the at least one second source heat exchanger; and
at least one of:
the flow through the at least one water-to-water heat pump; and
the operation of the at least one water-to-water heat pump;
at least one third hydronic load circulator fluidly connected downstream of the at least one first hydronic load circulator and fluidly connected to at least one of:
the thermally conductive structure; and
the at least one second hydronic coil-to-air heat exchanger; and
circulates the first hydronic supply fluid through at least one of:
the thermally conductive structure; and
the at least one second hydronic coil-to-air heat exchanger;
at least one fourth hydronic load circulator fluidly connected downstream of the at least one second hydronic load circulator and fluidly connected to at least one of:
the thermally conductive structure; and
the at least one second hydronic coil-to-air heat exchanger; and
circulates the second hydronic supply fluid through at least one of:
the thermally conductive structure; and
the at least one second hydronic coil-to-air heat exchanger;
at least one second thermal load 3-way control valve in fluid connection with:
the thermally conductive structure;
the at least one second hydronic coil-to-air heat exchanger;
the first hydronic supply fluid; and
the second hydronic supply fluid;
wherein the at least one second thermal load 3-way control valve modulates a flow between the first hydronic supply fluid and the second hydronic supply fluid to the at least one thermally conductive structure and the at least one second hydronic coil-to-air heat exchanger;
the at least one first temperature sensor configured to sense a temperature in the conditioned space and output the sensed temperature to at least one microprocessor controller;
at least one second temperature sensor configured to sense a temperature in the at least one thermally conductive structure and output the sensed temperature to the at least one microprocessor controller;
at least one third temperature sensor configured to sense a temperature in the DOAS and output the sensed temperature to the at least one microprocessor controller;
at least one fourth temperature sensor configured to sense a temperature in the fresh air supply and output the sensed temperature to the at least one microprocessor controller;
the at least one first humidity sensor configured to sense the humidity in the conditioned space and output the sensed humidity in the conditioned space to the at least one microprocessor controller;
at least one second humidity sensor configured to sense a humidity in the DOAS and output the sensed humidity in the DOAS to the at least one microprocessor controller;

at least one third humidity sensor configured to sense a humidity in the fresh air supply and output the sensed humidity in the fresh air supply to the at least one microprocessor controller;
a plurality of sensors that send a plurality of sensor outputs to the at least one microprocessor controller, the plurality of sensors selected from the group consisting of at least four of:
at least two of:
the at least one first temperature sensor;
the at least one second temperature sensor;
the at least one third temperature sensor; and
the at least one fourth temperature sensor;
at least one of:
the at least one first humidity sensor;
the at least one second humidity sensor;
the at least one third humidity sensor;
an atmospheric pressure sensor;
a differential temperature sensor;
an air velocity sensor;
a fluid velocity sensor;
a watt/hour meter; and
a real time energy use sensor;
a building automation system comprising a client/server architecture and the at least one microprocessor controller;
at least one memory coupled to and readable by the at least one microprocessor controller and storing therein a plurality of instructions that, when executed by the at least one microprocessor controller, causes the at least one microprocessor controller to:
receive at least one of:
a cooling set point temperature for the conditioned space; and
a heating set point temperature for the conditioned space;
receive at least two of:
a temperature from at least one of:
the at least one first temperature sensor;
the at least one second temperature sensor;
the at least one third temperature sensor; and
the at least one fourth temperature sensor;
a humidity level from at least one of:
the at least one first humidity sensor;
the at least one second humidity sensor; and
the at least one third humidity sensor;
calculate at least one of:
the at least one fresh air dew point temperature of the fresh air supply;
the at least one conditioned air dew point temperature of the air moving into the conditioned space from the DOAS;
the at least one conditioned space dew point temperature using the temperature sensed by the at least one first temperature sensor and using the humidity sensed by the at least one first humidity sensor; and
at least one thermally conductive structure dew point temperature using the temperature sensed by the at least one second temperature sensor and the humidity sensed by the at least one first humidity sensor;
receive at least one of:
a temperature of the at least one cold water supply and a set point temperature of the at least one cold water supply; and
a temperature of the at least one hot water supply and a set point temperature of the at least one hot water supply;
execute at least four of:
send a first hydronic load circulator control signal to the at least one first hydronic load circulator causing the at least one first hydronic load circulator to circulate the mixed radiant supply fluid; and
send a second hydronic load circulator control signal to the at least one second hydronic load circulator causing the at least one second hydronic load circulator to circulate the at least one hot water supply;
send a mixed radiant supply control signal to at least one of:
the at least one first radiant mixing device; and
the at least one first hydronic load circulator;
that modulates at least one of:
the temperature of the mixed radiant supply fluid; and
a flow rate of the mixed radiant supply fluid to maintain a temperature of the at least one thermally conductive structure above at least one of:
the at least one conditioned air dew point temperature;
the at least one conditioned space dew point temperature; and
the at least one thermally conductive structure dew point temperature;
send a DOAS temperature control signal to the DOAS that modulates a temperature of the conditioned air from the DOAS into the conditioned space;
send a hydronic-to-air circulator dehumidification control signal to the at least one hydronic-to-air circulator causing the at least one hydronic-to-air circulator to circulate the first coil supply fluid below a temperature of at least one of:
the at least one conditioned air dew point temperature; and
the at least one fresh air dew point temperature;
send a hydronic-to-air circulator heating control signal to the at least one hydronic-to-air circulator causing the at least one hydronic-to-air circulator to circulate the second coil supply fluid;
send a DOAS humidity control signal to the DOAS that modulates a humidity of the conditioned air from the DOAS into the conditioned space; and
send a DOAS ventilation control signal to the DOAS to modulate a flow of the fresh air into the conditioned space.

55. The system according to claim 54 wherein at least one of:
the at least one cold water supply and the at least one hot water supply comprise a portion of a heat transfer fluid circulating through a tank.

56. The system according to claim 55 wherein the heat transfer fluid contained in the tank and the heat transfer fluid contained in at least one of the first piping and a second piping is comprised of at least one portion of a water and at least one portion of a propylene glycol.

57. The system according to claim 54 wherein at least one of:

the at least one cold water supply and the at least one hot water supply comprise a portion of a heat transfer fluid circulating through the first piping and a second piping.

58. The system according to claim 54 wherein:
the at least one cold water supply comprises a first thermal storage for receiving thermal energy and the at least one hot water supply comprises a second thermal storage for transferring thermal energy.

59. The system according to claim 58 wherein at least one of:
the at least one cold water supply and the at least one hot water supply circulates through the first piping and a second piping.

60. The system according to claim 58 wherein at least one of:
the at least one cold water supply and the at least one hot water supply circulates through a tank.

61. The system according to claim 54 wherein a heat transfer fluid is fluidly connected is at least one of:
thermally and fluidly connected using the heat transfer fluid which circulates without using at least one external heat exchanger through which the heat transfer fluid circulates; and
fluidly connected using the heat transfer fluid which circulates through the at least one external heat exchanger.

62. The system according to claim 54 wherein the at least one source process heat exchanger comprises at least one boiler and at least one chiller.

63. The system according to claim 54 wherein the at least one source process heat exchanger is selected from the group consisting of:
a cooling tower;
a solar thermal array;
an air-to-water heat pump;
a reversing chiller; and
a process heat exchanger.

64. The system according to claim 54 wherein the building automation system further comprises at least one of:
a BACnet building automation protocol;
a Modbus building automation protocol; and
a LonWorks building automation protocol.

* * * * *

UNITED STATES PATENT AND TRADEMARK OFFICE
CERTIFICATE OF CORRECTION

PATENT NO. : 11,644,214 B2
APPLICATION NO. : 17/677710
DATED : May 9, 2023
INVENTOR(S) : Albert Reid Wallace Page 1 of 1

It is certified that error appears in the above-identified patent and that said Letters Patent is hereby corrected as shown below:

In the Claims

Column 45,
Line 5, Add the word -- and -- after the word "exchanger," and before the word "the".
Line 17, Delete the word "the" and replace with the word -- a --.

Signed and Sealed this
Twenty-seventh Day of June, 2023

Katherine Kelly Vidal
*Director of the United States Patent and Trademark Office*